US012389934B2

(12) United States Patent
Bagheri et al.

(10) Patent No.: US 12,389,934 B2
(45) Date of Patent: Aug. 19, 2025

(54) ORGANIC-BASED NICOTINE GEL COMPOSITIONS

(71) Applicant: JUUL Labs, Inc., San Francisco, CA (US)

(72) Inventors: Samira Bagheri, Mountain View, CA (US); Namhey Lee, Hayward, CA (US); Anusha Saripalli, Santa Clara, CA (US); Krishnamohan Sharma, Milpitas, CA (US)

(73) Assignee: JUUL Labs, Inc., Washington, DC (US)

( * ) Notice: Subject to any disclaimer, the term of this patent is extended or adjusted under 35 U.S.C. 154(b) by 459 days.

(21) Appl. No.: 17/845,341

(22) Filed: Jun. 21, 2022

(65) Prior Publication Data

US 2022/0322730 A1 Oct. 13, 2022

Related U.S. Application Data

(63) Continuation of application No. PCT/US2020/065485, filed on Dec. 17, 2020.

(60) Provisional application No. 62/950,783, filed on Dec. 19, 2019, provisional application No. 62/950,787, filed on Dec. 19, 2019.

(51) Int. Cl.

| | |
|---|---|
| ***A24B 15/24*** | (2006.01) |
| ***A24B 15/16*** | (2020.01) |
| ***A24B 15/30*** | (2006.01) |
| ***A24B 15/32*** | (2006.01) |
| ***A24F 40/10*** | (2020.01) |
| ***A24F 40/42*** | (2020.01) |
| ***B01J 13/00*** | (2006.01) |
| ***C08J 3/24*** | (2006.01) |

(52) U.S. Cl.
CPC .......... *A24B 15/243* (2013.01); *A24B 15/165* (2013.01); *B01J 13/0052* (2013.01); *C08J 3/245* (2013.01); *A24F 40/42* (2020.01)

(58) Field of Classification Search
None
See application file for complete search history.

(56) References Cited

U.S. PATENT DOCUMENTS

| | | | |
|---|---|---|---|
| 2,162,738 | A | 6/1939 | McCoy |
| 2,938,818 | A | 5/1960 | Specht |
| 3,012,915 | A | 12/1961 | Howard |
| 3,847,326 | A | 11/1974 | Webster |

(Continued)

FOREIGN PATENT DOCUMENTS

| | | | |
|---|---|---|---|
| CA | 622523 | A | 6/1961 |
| CN | 102316850 | A | 1/2012 |

(Continued)

OTHER PUBLICATIONS

Chan, et al. (May 2009), Prediction Models for Shape and Size of ca-Alginate Macrobeads Produced Through Extrusion-Dripping Method, Journal of Colloid and Interface Science 338(1):63-72.

*Primary Examiner* — Philip Y Louie
*Assistant Examiner* — Madeleine P Delacruz
(74) *Attorney, Agent, or Firm* — Mintz, Levin, Cohn, Ferris, Glovsky and Popeo, P.C.

(57) ABSTRACT

Compositions include an aqueous organic-based gellant system and nicotine or a salt thereof. The compositions are readily prepared and stored in cartridges or used directly in a device for delivering nicotine to a user.

20 Claims, 9 Drawing Sheets

Solution A Cellulose precursor (Cellulose Acetate) {blue color} + Organic Solvent (Methanol) {red color} + Nicotine {gray color}
Solution B Water based Polymer (PF-127) {yellow color}
Solution C Solution A + Solution B inside the dialysis

(56) References Cited

U.S. PATENT DOCUMENTS

| | | | |
|---|---|---|---|
| 3,880,172 A | 4/1975 | Anderson et al. | |
| 5,525,351 A | 6/1996 | Dam | |
| 6,344,222 B1 | 2/2002 | Cherukuri et al. | |
| 7,040,314 B2 | 5/2006 | Nguyen et al. | |
| 7,581,540 B2 | 9/2009 | Hale et al. | |
| 8,356,606 B2 | 1/2013 | Sengupta et al. | |
| 8,402,978 B2 | 3/2013 | Karles et al. | |
| 8,485,180 B2 | 7/2013 | Smutney et al. | |
| 8,741,348 B2 | 6/2014 | Hansson et al. | |
| 8,893,724 B2 | 11/2014 | Woodcock et al. | |
| 10,195,345 B2 | 2/2019 | Senior et al. | |
| 10,328,443 B2 | 6/2019 | Ricketts et al. | |
| 10,609,958 B2 | 4/2020 | Robinson et al. | |
| 10,856,573 B2 | 12/2020 | Pijnenburg et al. | |
| 10,952,452 B2 | 3/2021 | Sengupta et al. | |
| 11,053,395 B2 | 7/2021 | Karles et al. | |
| 11,246,344 B2 | 2/2022 | Griffith, Jr. et al. | |
| 11,259,569 B2 | 3/2022 | Hejazi | |
| 2005/0056294 A1 | 3/2005 | Wanna et al. | |
| 2006/0171990 A1 | 8/2006 | Asgari | |
| 2006/0191548 A1* | 8/2006 | Strickland | A24B 15/16 131/347 |
| 2010/0006092 A1 | 1/2010 | Hale et al. | |
| 2011/0083681 A1* | 4/2011 | Sengupta | A24B 13/00 131/310 |
| 2011/0232657 A1 | 9/2011 | Karles et al. | |
| 2012/0152264 A1 | 6/2012 | Coleman et al. | |
| 2012/0199149 A1 | 8/2012 | Strickland et al. | |
| 2013/0255702 A1 | 10/2013 | Griffith, Jr. et al. | |
| 2015/0013693 A1 | 1/2015 | Fuisz et al. | |
| 2015/0068545 A1 | 3/2015 | Moldoveanu et al. | |
| 2016/0136153 A1 | 5/2016 | Jenkins | |
| 2016/0295910 A1 | 10/2016 | Besso et al. | |
| 2017/0071249 A1 | 3/2017 | Ampolini et al. | |
| 2017/0099877 A1 | 4/2017 | Worm et al. | |
| 2017/0251714 A1 | 9/2017 | Mishra et al. | |
| 2017/0265517 A1 | 9/2017 | Swede et al. | |
| 2017/0340005 A1 | 11/2017 | Terao | |
| 2018/0029782 A1 | 2/2018 | Zuber et al. | |
| 2018/0042302 A1 | 2/2018 | Robinson et al. | |
| 2018/0084823 A1 | 3/2018 | Fuisz et al. | |
| 2018/0199617 A1 | 7/2018 | Iodice | |
| 2018/0228203 A1 | 8/2018 | Pithawalla et al. | |
| 2018/0310624 A1 | 11/2018 | Parker et al. | |
| 2019/0183177 A1 | 6/2019 | Hubbard et al. | |
| 2022/0211092 A1* | 7/2022 | Arafat Arafat | B01J 13/02 |
| 2022/0312841 A1 | 10/2022 | Diokno et al. | |

FOREIGN PATENT DOCUMENTS

| | | | | |
|---|---|---|---|---|
| CN | 108277085 A | 7/2018 | | |
| CN | 108366614 A | 8/2018 | | |
| CN | 109105944 A | 1/2019 | | |
| CN | 109310622 A | 2/2019 | | |
| CN | 111685388 A | 9/2020 | | |
| EP | 0135265 A2 | 3/1985 | | |
| EP | 0405190 A2 | 1/1991 | | |
| EP | 0509657 A1 | 10/1992 | | |
| EP | 0419974 B1 | 12/1996 | | |
| EP | 2077731 B1 | 8/2011 | | |
| EP | 2205105 B1 | 9/2012 | | |
| EP | 2645886 B1 | 4/2015 | | |
| EP | 2753197 B1 | 9/2015 | | |
| EP | 2552237 B1 | 10/2016 | | |
| EP | 2844088 B1 | 11/2016 | | |
| EP | 2741625 B1 | 4/2017 | | |
| EP | 2811849 B1 | 4/2018 | | |
| EP | 2552248 B1 | 9/2019 | | |
| EP | 2632562 B1 | 8/2020 | | |
| EP | 3089602 B1 | 9/2020 | | |
| EP | 3110264 B1 | 9/2020 | | |
| EP | 3481237 B1 | 9/2020 | | |
| EP | 3297460 B1 | 12/2020 | | |
| EP | 3110265 B1 | 2/2021 | | |
| EP | 3240442 B1 | 2/2022 | | |
| EP | 3240439 B1 | 6/2022 | | |
| EP | 3911390 B1 | 10/2022 | | |
| EP | 3846643 B1 | 11/2022 | | |
| EP | 3846644 B1 | 11/2022 | | |
| EP | 3860376 B1 | 5/2023 | | |
| GB | 1484573 A | 9/1977 | | |
| KR | 10-2016-0004298 A | 1/2016 | | |
| KR | 10-2019-0083314 A | 7/2019 | | |
| WO | WO-9312675 A2 | 7/1993 | | |
| WO | WO-9520330 A1 | 8/1995 | | |
| WO | WO-9530411 A1 | 11/1995 | | |
| WO | WO-2005007068 A1 | 1/2005 | | |
| WO | WO-2012026963 A2 | 3/2012 | | |
| WO | WO-2012134380 A1 | 10/2012 | | |
| WO | WO-2013030202 A1 | 3/2013 | | |
| WO | WO-2015179388 A1 | 11/2015 | | |
| WO | WO-2015193242 A2 | 12/2015 | | |
| WO | WO-2015197674 A1 | 12/2015 | | |
| WO | WO-2017046363 A1 | 3/2017 | | |
| WO | WO-2017075975 A1 | 5/2017 | | |
| WO | WO-2018122375 A1 | 7/2018 | | |
| WO | WO-2018224339 A1 | 12/2018 | | |
| WO | WO-2019015339 A1 | 1/2019 | | |
| WO | WO-2019048880 A1 | 3/2019 | | |
| WO | WO-2019071910 A1 | 4/2019 | | |
| WO | WO-2019086859 A1 | 5/2019 | | |
| WO | WO-2019129843 A1 | 7/2019 | | |
| WO | WO-2019193209 A1 | 10/2019 | | |
| WO | WO-2019193311 A1 | 10/2019 | | |
| WO | WO-2020025718 A1 * | 2/2020 | | A24B 15/14 |
| WO | WO-2021026443 A1 | 2/2021 | | |

* cited by examiner 2.5% 100-200 CPS 3.5% 300-400 CPS

5% 300-400 CPS

ORGANIC-BASED NICOTINE GEL COMPOSITIONS

CROSS-REFERENCE TO RELATED APPLICATIONS

The present application is a continuation application, filed under 35 U.S.C. § 120, of International Patent Application No. PCT/US2020/065485 entitled "Organic-Based Nicotine Gel Compositions" with an International Filing Date of Dec. 17, 2020, which claims priority to U.S. Provisional Patent Application No. 62/950,783 entitled "Organic-Based Nicotine Gel Compositions" filed on Dec. 19, 2019, and to U.S. Provisional Patent Application No. 62/950,787 entitled "Organic-Based Nicotine Gel Compositions" filed on Dec. 19, 2019, each of which is incorporated herein by reference in its entirety.

BACKGROUND

The present disclosure relates to compositions for use in electronic vapor devices. In particular, the present disclosure relates to organic-based gel compositions and their use in electronic vapor devices.

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic nicotine delivery systems (ENDS) include a class of vaporizer devices that are battery powered and that may be used to simulate the experience of smoking, but without burning of tobacco or other substances.

In use of a vaporizer device, the user inhales an aerosol, commonly called vapor, which may be generated by a heating element that vaporizes (e.g., causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a separable part of the vaporizer that contains the vaporizable material in a reservoir) that includes a mouthpiece (e.g., for inhalation by a user).

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable material to form a vapor for inhalation by a user of the vaporization device.

Various vaporizable materials having a variety of contents and proportions of such contents can be contained in the cartridge. Some vaporizable materials, for example, may have a smaller percentage of active ingredients per total volume of vaporizable material, such as due to regulations requiring certain active ingredient percentages. As a result, a user may need to vaporize a large amount of vaporizable material (e.g., compared to the overall volume of vaporizable material that can be stored in a cartridge) to achieve a desired effect.

SUMMARY in some aspects, embodiments herein relate to compositions comprising an aqueous polysaccharide-based gellant system comprising a polysaccharide and a gel modifier, and nicotine or a salt thereof.

In other aspects, embodiments herein relate to compositions comprising a cellulose matrix, nicotine or a salt thereof, and a water-soluble polymer.

In further aspects, embodiments herein relate to composition comprising an alginate, nicotine or salt thereof, and an alginate crosslinker.

In still further aspects, embodiments herein provide for the preparation of such compositions and their containment in a cartridge or their presence in a device for delivering nicotine to a user.

In some aspects, embodiments herein relate to compositions comprising a superabsorbent polymer and nicotine or a salt thereof.

In other aspects, embodiments herein relate to compositions made by a process comprising providing a polyacrylamide polymer; and adding a solution of nicotine to the polyacrylamide polymer thereby loading the superabsorbent polymer with nicotine.

In other aspects, embodiments here relate to cartridges for use in a device for delivery of nicotine or salt thereof to a user, the cartridge comprising a composition as disclosed herein.

In other aspects, embodiment herein relate to devices comprising a healing element configured to heat a composition, as disclosed herein, to deliver nicotine or salt thereof to a user.

In other aspects, embodiments herein relate to processes comprising providing a superabsorbent polymer and adding a solution of nicotine to the superabsorbent polymer.

DETAILED DESCRIPTION

Figure 1:
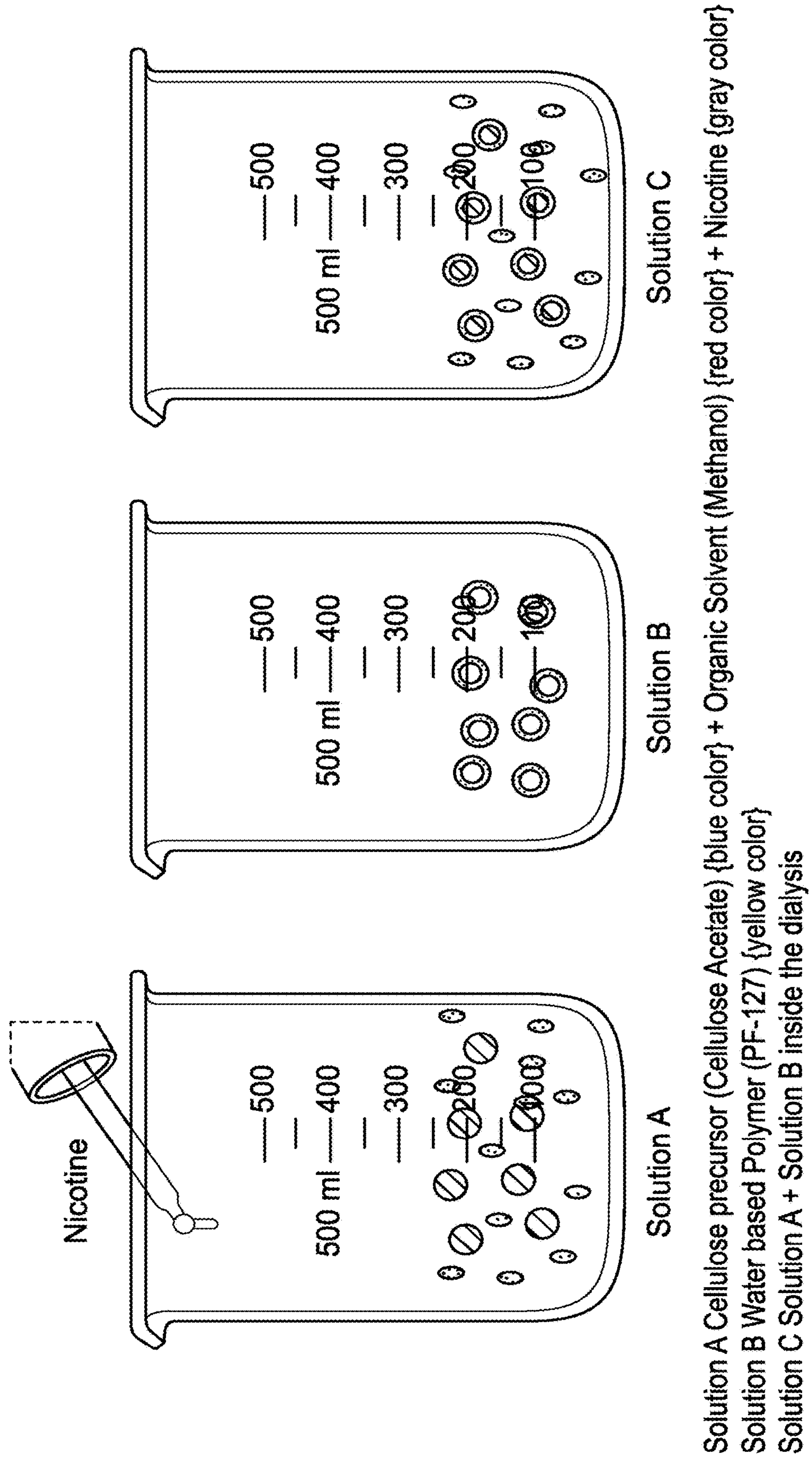
FIG. 1 shows a process scheme for making a cellulose-based gellant system comprising nicotine and a water-soluble polymer, in accordance with some embodiments.

Embodiments herein provide compositions comprising polysaccharide-based gellant systems that permit the immobilization and/or encapsulation of nicotine or its salts within the polysaccharide polymer matrix. In embodiments, compositions are useful when used in connection with a device that heats the composition to deliver nicotine or its salt to a user. In embodiments, the gellant systems may provide an opportunity to move away from typical propylene glycol/vegetable glycerin (PG/VG) based carriers by reducing or eliminating PG/VG and using water as a primary carrier. In embodiments, the use of water-based carriers may lower the operating temperature of the devices that heat the compositions. Such reduction in operating temperatures may improve battery life and facilitate reducing device size. Polysaccharides are biomaterials generally regarded as safe.

In embodiments, the gellant systems described herein may allow for control of nicotine concentration per unit weight of composition in readily portionable quantities enabling precise dosage control. In embodiments, the viscosity of the gellant systems can be readily tuned, including by way of controlling the concentration of the gellant system components (both the polysaccharides and gel modifiers). Such control of viscosity may allow for a gellant system that prevents or greatly reduces problems of leakage encountered when employing liquids in vapor devices.

As semi-solids, the gellant compositions disclosed herein may also provide new storage opportunities, such as moving away from the use of disposable cartridges, thereby reducing waste.

Embodiments herein provide compositions comprising a superabsorbent polymer and nicotine. The compositions, which take the form of gels, may be useful, for example, when used in connection with a device that heats the composition to deliver nicotine or its salt to a user.

Because of their gel form, the disclosed compositions may, in embodiments, also ameliorate issues of ingredient-based (such as flavorants) physical property variation such as viscosity, contact angle, and leakage associated with conventional e-liquids. Thus, the gel compositions may, in embodiments, simplify the formulation process compared to liquid formulations. The gel compositions may, in embodiments, affect flavor loading because the impact of the flavor component on liquid physical properties is removed as a variable when operating in a gel format.

In embodiments, the disclosed compositions also have sufficiently high gel strength to hold their shape thereby facilitating changes and simplification in heater designs, while removing dependence on a device having a wick. In embodiments, the compositions can be in direct contact with the heater surface thereby providing increased heat transfer and efficiency. Performance of the compositions herein may, in embodiments, improve product delivery consistency by removing variation due to wick behavior when using liquids which have varying physical properties that can change as a function of temperature.

In embodiments, the compositions disclosed herein can be formulated as hydrogels which are gels capable of absorbing large amounts of liquid (including 20 times their original size or more). Hydrogels may be sphericalor formed to any desired geometry. The hydrogels disclosed herein may, in embodiments, be composed of a superabsorbent polymers such as polyacrylamide, poly(methyl acrylate) and sodium polyacrylate, although polysaccharide-based hydrogels may be employed in other embodiments. In embodiments, the compositions disclosed herein may be biodegradable, and environmentally safe. In embodiments, hydrogels can break down over time into nitrogen, carbon dioxide and water. Superabsorbent polymers (SAPs) can absorb a wide variety of liquid solutions including, in embodiments, aqueous and organic-based solutions. In embodiments, SAP's ability to absorb liquid can be modulated based on, for example, the ionic concentration of the solution and degree of crosslinking, if any. Such flexibility in tuning liquid absorption can facilitate precision loading of active ingredient materials into the superabsorbent polymer gel matrix.

Those skilled in the art will appreciate these and other advantages of the embodiments disclosed herein.

Definitions

As used herein "a," "an," or "the" not only include aspects with one member, but also include aspects with more than one member. For instance, the singular forms "a," "an," and "the" include plural referents unless the context clearly dictates otherwise. Thus, for example, reference to "a polysaccharide" includes a plurality of such polysaccharides and reference to "the crosslinker" includes reference to or other gel modifiers, which may include, for example, one or more crosslinkers, known to those skilled in the art, and so forth.

As used herein, the term "about," is intended to qualify the numerical values that it modifies, denoting such a value as variable within a margin of error. When no particular margin of error is assigned, such as a standard deviation to a mean value, the term "about" should be understood to mean that range which would encompass the recited value and the range which would be included by rounding up or down to that figure, taking into account significant figures.

As used herein, "gel" is used in accordance with its ordinary meaning. The IUPAC provides guidance: a gel is a non-fluid colloidal network or polymer network that is expanded through its whole volume by a fluid. *IUPAC. Compendium of Chemical Terminology, 2nd ed. (the "Gold Book")*. Compiled by A. D. McNaught and A. Wilkinson. *Blackwell Scientific Publications*, Oxford (1997). The gels disclosed herein are polysaccharide based and typically are formed via crosslinking and/or physical aggregation of polymer chains. A gel network is typically characterized as having regions of local order. In aqueous media, the gel is typically referred to as a "hydrogel." This contrasts with gels in organic solvent systems "organogels" or where solvent is substantially removed, "xerogels."

As used herein, "polysaccharide-based gellant system" refers to a chemical gel system having at least two components. The first component is a polysaccharide compound (e.g. structure) capable of forming a gel either on its own or with the aid of a secondary additive, also referred to herein as a "secondary component" or "gel modifier," as defined below. This second component may facilitate gel formation and/or modify the physical properties of a polysaccharide gel including such properties as viscosity, polymer swelling, crosslinking, macromolecular assembly, and the like. Exemplary systems include a polysaccharide and a crosslinker or a polysaccharide and a secondary hydrophilic polymer.

As used herein, "gel modifier" is a compound that modulates the supramolecular architecture (e.g. crosslinking) of the polysaccharide that forms the basis of the gel structure. While some polysaccharides described herein may be capable of performing the role of a primary polysaccharide of a gellant system and the role of a gel modifier, the gellant systems herein are two component systems such that the polysaccharide and the gel modifier are not the same molecule. Thus, a polysaccharide that gels in water with no further additives is a gellant system but does not contain a gel modifier. Gel modifiers may be integral to actual gel formation such that no gel forms with particular polysaccharides in the absence of the gel modifier. In embodiments, gel modifiers provide a crosslinking function. In embodiments, gel modifiers may operate on existing polysaccharide gels to change the supramolecular organization. In embodiments, gel modifiers may cause the gel to be stiffer or more relaxed. In embodiments, some gel modifiers may play a role in modulating gel viscosity and/or mechanical strength. In embodiments, gel modifiers alter the nature of the gel structure. Gel modifiers may include crosslinkers, such as metal ions and/or surfactants, water-soluble polymers, secondary polysaccharides, organic acids, organic bases, aldehydes, amines, radical sources, such as methacrylated alginates photopolymerized with photoinitiators, 2-hydroxy-1-[4-(2-hydroxyethoxy) phenyl]-2-methyl-1-propanone (Irgacure 2959) and combinations thereof.

As used herein, "nicotine" refers to both its free base and salt form. The salt form is typically generated by adding an organic acid to nicotine, although inorganic acids such as hydrochloric acid, hydrobromic acid, sulfuric acid, phosphoric acid, may also be used to form salts. Organic acids include, without limitation, benzoic acid, pyruvic acid, salicylic acid, levulinic acid, malic acid, succinic acid, and citric acid.

The term "electronic cigarette" or "e-cigarette" or (electronic vapor device) as used herein, refers to an electronic inhaler that vaporizes a portion of the gel compositions disclosed herein into an aerosol mist, simulating the act of tobacco smoking. There are many electronic cigarettes which do not resemble conventional cigarettes at all. The amount of nicotine contained can be chosen by the user via the inhalation. In general, an electronic cigarette contains three components: a plastic cartridge that serves as a mouthpiece and a containing means for the compositions herein, an "atomizer" that vaporizes the compositions, and a battery.

Compositions

In embodiments, there provided compositions comprising an aqueous polysaccharide-based gellant system comprising a polysaccharide and a gel modifier along with nicotine or a salt thereof. Polysaccharide-based gellant systems are designed as carriers for nicotine which may be integrated into a device to deliver nicotine to a user, as described herein below. The selection of a particular polysaccharide may be guided by both performance characteristics of the gel as well as safety and stability issues. In general, polysaccharide-based systems benefit from being classified as "generally regarded as safe" (GRAS) ingredients. Polysaccharides of a wide variety of structures give access to gels of differing strength (measurable as a viscosity, for example) and form, such as beads, paste-like materials, and bulk solid jelly-like masses. In embodiments, polysaccharide-based gels may be tuned by controlling the molecular weight of the polysaccharide. In embodiments, polysaccharide-based gels may be tuned by controlling temperature of gel formation. In embodiments, polysaccharide-based gels may be tuned by controlling pH. In embodiments, polysaccharide-based gels may be tuned by controlling any combination of aforementioned factors. In embodiments, gel systems may be thermoreversible. A thermoreversible gel may be a gel at ambient temperatures but may liquefy upon heating and return to gel form on cooling. In other embodiments, the polysaccharide-based gel systems are specifically selected to not be thermoreversible.

One or more features of polysaccharides selected for the gellant systems disclosed herein may affect interactions with an inhalable bioactive agent. In embodiments, the polysaccharide may have a hydrophobic core to accommodate an inhalable bioactive agent in aqueous media. In embodiments, the presence of a charged group in the polysaccharide backbone can interact with the inhalable bioactive agent or its salt. In embodiments, the degree of branching in the polysaccharide polymer can be modified to interact with an inhalable bioactive agent. In embodiments, gelation temperatures may affect interaction between the gellant system and an inhalable bioactive agent. In embodiments, the use of crosslinkers can impact gel formation or modify gel viscosity impacting interaction between the gellant system and an inhalable bioactive agent. In embodiments, the polysaccharide in the aqueous polysaccharide-based gellant system provided herein is hydrophobic. In embodiments, the polysaccharide forms a hydrophobic core within the aqueous polysaccharide-based gellant system. In embodiments, the polysaccharide is cellulose. In embodiments, the polysaccharide is amylose.

In embodiments, the polysaccharide of the gellant system is selected from the group consisting of an alginic acid, a cellulose, a guar (galactomannan), a xanthan gum, an agar, a gellan, an amylose, a welan gum, a rhamsan, a carrageenan, a chitosan, a scleroglucan, a diutan gum, a pectin, a starch, derivatives thereof, and combinations thereof. In embodiments, the polysaccharide of the gellant system is an alginic acid. In embodiments, the polysaccharide of the gellant system is a cellulose. In embodiments, the polysaccharide of the gellant system is a guar (galactomannan). In embodiments, the polysaccharide of the gellant system is a xanthan gum. In embodiments, the polysaccharide of the gellant system is an agar. In embodiments, the polysaccharide of the gellant system is a gellan. In embodiments, the polysaccharide of the gellant system is an amylose. In embodiments, the polysaccharide of the gellant system is a welan. In embodiments, the polysaccharide of the gellant system is rhamsan. In embodiments, the polysaccharide of the gellant system is a carrageenan. In embodiments, the polysaccharide of the gellant system is a chitosan. In embodiments, the polysaccharide of the gellant system is a scleroglucan. In embodiments, the polysaccharide of the gellant system is a diutan gum. In embodiments, the polysaccharide of the gellant system is a pectin. In embodiments, the polysaccharide of the gellant system is a starch. In embodiments, the polysaccharide of the gellant system is a derivative of any of the polysaccharides disclosed herein. In embodiments, the polysaccharide of the gellant system is a combination of any of the polysaccharides disclosed herein.

In embodiments, alginic acids may be provided in salt form prior to gelation. In embodiments, alginic acid precursor for gel formation is a salt form selected from the group consisting of sodium alginate, ammonium alginate, and potassium alginate. Alginic acids have the general structure of formula (I):

(I)

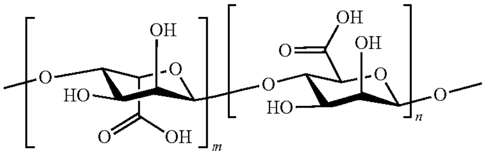

having repeating blocks of beta-D-mannuronate (M) and alpha-L-guluronate (G) and where m and n define a ratio of M to G of 1.6:1. In embodiments, m and n have a combined effect of providing a number resulting in a polymer with a weight average molecular weights ranging from about 1 Kdaltons to about 600 Kdaltons. In embodiments, m and n have a combined effect of providing a number resulting in a polymer with a weight average molecular weights ranging from about 5 Kdaltons to about 100 Kdaltons. In embodiments, m and n have a combined effect of providing a number resulting in a polymer with a weight average molecular weights ranging from about 6 Kdaltons to about 16 Kdaltons. In embodiments, alginate structures display three block types, sections of homo M, as in MMMMMM, blocks of homo G, as in GGGGGG, and blocks of alternating G and M as in GMGMGMGM. The total number of residues (m+n) can vary from about 50 residues to about 100,000 residues. In embodiments, a number average molecular weight may be from about 1 Kdaltons to about 50 Kdaltons. In embodiments, a number average molecular weight may be from about 1 Kdaltons to about 20 Kdaltons. In embodiments, a number average molecular weight may be from about 10 Kdaltons to about 50 Kdaltons. In embodiments, where the gellent system includes alginic acid, the crosslinker can be a metal crosslinker. In embodiments, the metal crosslinker is a divalent metal ion. In embodiments, the metal crosslinker is a trivalent metal ion. Alginic acid can also be co-crosslinked with other polysaccharides, such as chitosan.

In embodiments, the polysaccharide-based gellant systems herein is a cellulose. In embodiments, the polysaccharide-based gellant systems herein is a precursor of a cellulose. In embodiments, the polysaccharide-based gellant systems herein is a cellulose derivative. In embodiments, the cellulose is selected from cellulose, methyl cellulose, ethyl cellulose, ethyl methyl cellulose, hydroxyethyl cellulose, hydroxypropyl cellulose, hydroxyethyl methyl cellulose, hydroxypropyl methyl cellulose, ethyl hydroxyl ethyl cellulose, carboxymethyl cellulose, carboxymethylhydroxyethyl cellulose, cellulose sulfate, cellulose acetate, and combinations thereof. In embodiments, the polysaccharide-based gellant systems herein is methyl cellulose. In embodiments, the polysaccharide-based gellant systems herein is ethyl cellulose. In embodiments, the polysaccharide-based gellant systems herein is ethyl methyl cellulose. In embodiments, the polysaccharide-based gellant systems herein is hydroxyethyl cellulose. In embodiments, the polysaccharide-based gellant systems herein is hydroxyethyl cellulose. In embodiments, the polysaccharide-based gellant systems herein is hydroxypropyl cellulose. In embodiments, the polysaccharide-based gellant systems herein is hydroxyethyl methyl cellulose. In embodiments, the polysaccharide-based gellant systems herein is hydroxypropyl methyl cellulose. In embodiments, the polysaccharide-based gellant systems herein is ethyl hydroxyl ethyl cellulose. In embodiments, the polysaccharide-based gellant systems herein is carboxymethyl cellulose. In embodiments, the polysaccharide-based gellant systems herein is carboxymethylhydroxyethyl cellulose. In embodiments, the polysaccharide-based gellant systems herein is cellulose sulfate. In embodiments, the polysaccharide-based gellant systems herein is cellulose acetate. In embodiments, the polysaccharide-based gellant systems herein is a combination of any cellulose or derivative of cellulose disclosed herein.

Cellulose itself has the structure of formula (II):

(II)

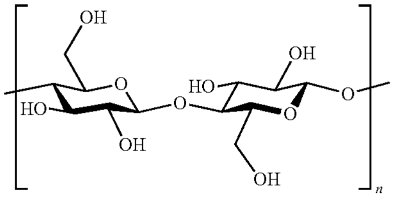

having a linear array of beta-D-glucose units where n may vary from about 10 to about 500. In embodiments, n can vary from about 20 to about 100. In embodiments, cellulose may have a number average molecular weight from 1 Kdaltons to about 20 Kdaltons. In embodiments, cellulose may have a number average molecular weight from 2 Kdaltons to about 15 Kdaltons. In embodiments, cellulose may have a number average molecular weights in a range from about 5.5 kdaltons to about 11 kdaltons. In embodiments, gellant systems employing the parent cellulose may be formed via a cellulose precursor such as cellulose acetate. In embodiments, the acetate groups can be removed by solvolysis. In embodiments, functionalized celluloses may be used to alter the polarity of the gellant system and/or to tune the viscosity of the resultant gel. In embodiments, charged cellulose derivatives carrying organic functional acids such as carboxymethyl cellulose have tunable viscosity via pH adjustment with acids or bases. In embodiments, charged cellulose derivatives may immobilize an inhalable bioactive agent. In embodiments, charged cellulose derivatives form a salt bridge with an inhalable bioactive agent. In embodiments, cellulose-based gels may be formed in the presence of water-soluble polymers as described herein further below.

In embodiments, the polysaccharide based gellant systems may employ a guar. In some such embodiments, the guar is selected from natural guar, hydroxypropylguar (HPG), sulfonated guar, sulfonated hydroxypropylguar, carboxymethyl hydroxypropyl guar (CMHPG), carboxymethylguar. In embodiments, the guar is a natural guar. In embodiments, the guar is hydroxypropylguar (HPG). In embodiments, the guar is sulfonated guar. In embodiments, the guar is sulfonated hydroxypropylguar. In embodiments, the guar is carboxymethyl hydroxypropyl guar (CMHPG). In embodiments, the guar is carboxymethyl guar. Guars have a core structure based on Formula (III):

(III)

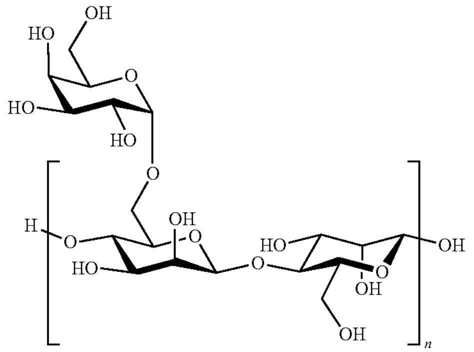

having pendant galactose unit appearing on a backbone of beta-linked mannose units where n provides molecular weights a number average molecular weight of about 100 to about 500 Kdaltons. In embodiments, n provides molecular weights a number average molecular weight of about 125 to about 300 Kdaltons. In embodiments, a weight average molecular weight may be in a range from about 500 Kdaltons to about 2,500 Kdaltons. In embodiments, a weight average molecular weight may be in a range from about 700 Kdaltons to about 1,500 Kdaltons. In embodiments, a number average molecular weight is ($M_n$) about 240 Kdaltons and a weight average molecular weight ($M_w$) of 950 Kdaltons. In embodiments, guars can be gelled in the presence of crosslinkers such as calcium ion, borates, titanates, and the like. In embodiments, guars bearing charged groups may assist in immobilizing the inhalable bioactive agent. In embodiments, the charged guar is sulfonated guar. In embodiments, functionalized guars may be used to tune the hydrophobicity/hydrophilicity of the gel system to accommodate the particular inhalable bioactive agent.

In embodiments, the polysaccharide-based gellant system may comprise a xanthan gum. Xanthan gums are obtained from the species of bacteria used, *Xanthomonas campestris*. Xanthan gums have a basic core structure of formula (IV):

(IV)

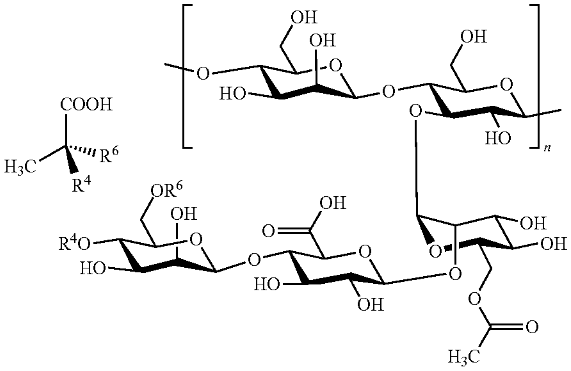

In embodiments, modified xanthan gums can be used in forming hydrogels. In embodiments, the native form xanthan gums can be used as gel modifiers including as viscosity modifying agents as disclosed herein. The value for n in formula IV, based on a 2 Kdalton MW of the formula (IV) monomer unit, provides a weight average molecular weight in a range from about 300 Kdaltons to about 8 megadaltons, in embodiments. In embodiments, the weight average molecular weight is in a range from about 500 Kdaltons to about 1 megadalton. In embodiments, the weight average molecular weight is in a range from about 700 Kdaltons to about 1 megadalton.

In embodiments, the polysaccharide-based gellant system may comprises an agar. Agar itself is typically a mixture of agarose of formula (V) and agaropectin:

(V)

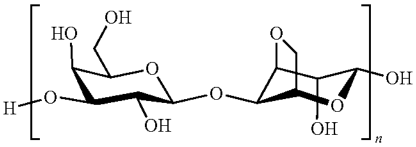

The agarose backbone is a disaccharide made up of D-galactose and 3,6-anhydro-L-galactopyranose. In embodiments, n has a value such that a molecular weight of agarose is about 50 to about 400 Kdaltons. In embodiments, n has a value such that a molecular weight of agarose is about 75 to about 200 Kdaltons. In embodiments, n has a value such that a molecular weight of agarose is about 120 kdaltons. Agaropectin is a heterogeneous mixture of smaller oligosaccharides which performs the function of a gel modifier as defined herein. In embodiments, agaropectin may have an ester sulfate content conferring a charge which may facilitate interaction with the inhalable bioactive agent.

In embodiments, the polysaccharide-based gellant system may comprise a gellan. Gellan gum water-soluble anionic polysaccharide produced by the bacterium *Sphingomonas elodea* of structural formula (VI):

(VI)

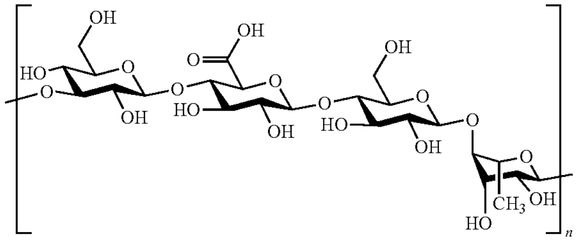

where n provides weight average molecular weights in a range from about 0.5 megadaltons to about 3 megadaltons. In embodiments, reduced weight gellans have molecular weights from about 0.5 megadaltons to about 1.5 megadaltons.

In embodiments, the polysaccharide-based gellant system may comprise an amylose. Amylose is comprised of alpha linked D glucose units as indicated in formula (VII) below:

(VII)

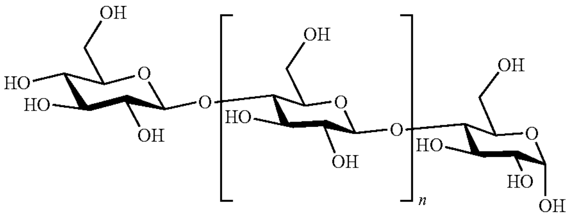

n embodiments, n is an integer from about 100 to about 1000. In embodiments, n is an integer from about 200 to about 700. In embodiments, n is an integer from about 300 to about 600. In embodiments, amylose can be provided in conjunction with starch, wherein starch provides the primary polysaccharide of the gellant system and amylose serves as the gel modifier. For example, amylose may be used to modulate gel viscosity of starch-based gellant systems. In other embodiments, amylose is the primary polysaccharide of the gellant-based system. In either role, as primary polysaccharide or gel modifier, amylose may be a favorable structure for nicotine interaction because of its generally hydrophobic interior. In embodiments, amylose may be particularly combined with xanthan gum, or alginate in other embodiments, or carrageenan in yet other embodiments.

In embodiments, the polysaccharide-based gellant system may comprise a welan gum. Welan gum is produced by fermentation of sugar by bacteria of the genus *Alcaligenes*. molecule consists of repeating tetrasaccharide units with single branches of L-mannose or L-rhamnose and is shown below as formula (VIII):

(VIII)

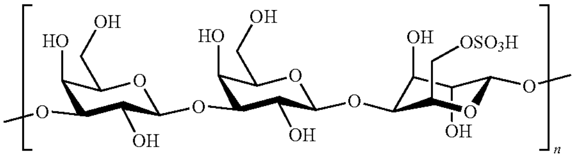

where n has a value such that a weight average molecular weight is in a range from about 0.25 megadaltons to about 3 megadaltons. In embodiments, n has a value such that a weight average molecular weight is in a range from about 0.5 megadaltons to about 2 megadaltons. In embodiments, n has a value such that a weight average molecular weight is about 1 megadalton.

In embodiments, the polysaccharide-based gellant system may comprise a rhamsan. Rhamsan gums may be obtained in acetylated or deacetylated form. Deacetylated rhamsan forms gel materials when crosslinked with divalent metal ions such as calcium ion. Deacetylated rhamsan gum can be particularly thermally stable in water and has a structure shown in formula (IX):

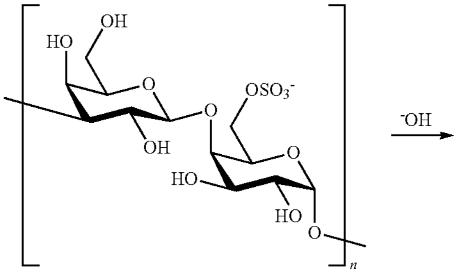

γ-carrageenan

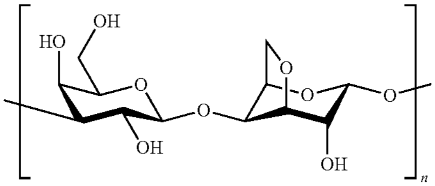

β-carrageenan (IX)

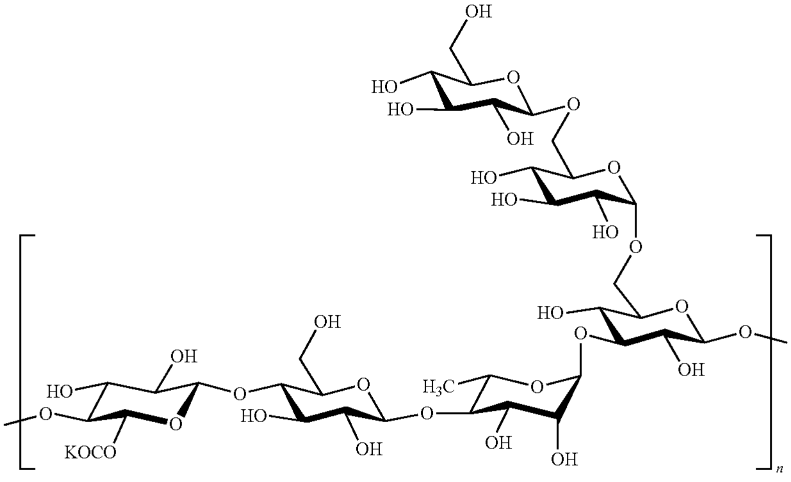

where n provides molecular weights in a range similar to that of diutan discussed herein further below.

In embodiments, the polysaccharide-based gellant system may include a carrageenan. Carrageenans polysaccharides come in three common forms naturally kappa, iota, and lambda. In embodiments, the structural variation provides access to gels with tunable properties. In embodiments, the carrageenan is kappa form. In embodiments, the carrageenan is iota form. In embodiments, the carrageenan is lambda form. Carrageenans include repeating galactose units and 3,6 anhydrogalactose and can be both sulfated and nonsulfated. The units are joined by alternating alpha-1,3 and beta-1,4 glycosidic linkages. The structures of numerous carrageenan cores are shown below. In embodiments, the carrageenan may be a lambda carrageenan. In embodiments, lambda carrageen is used in an aqueous system. In embodiments, the carrageenan is a sulfated form.

-continued

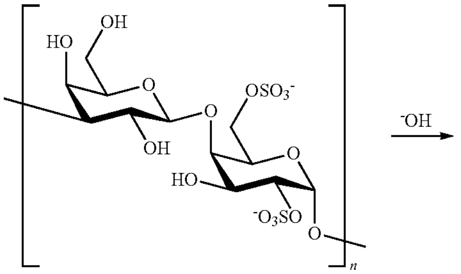

δ-carrageenan

-continued

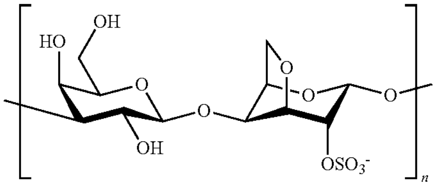

α-carrageenan

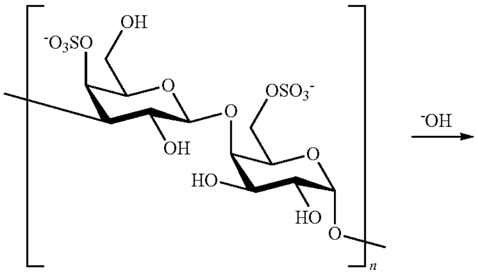

μ-carrageenan

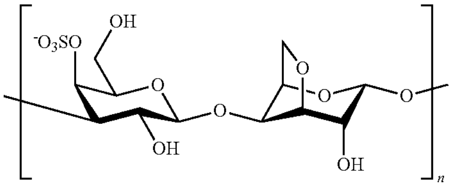

κ-carrageenan

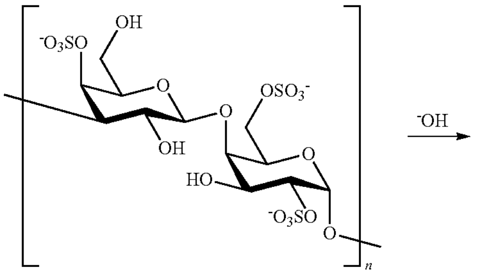

ν-carrageenan

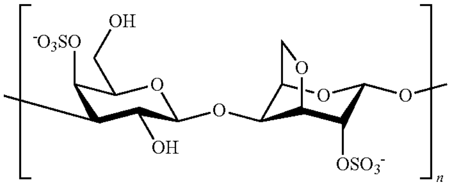

ι-carrageenan

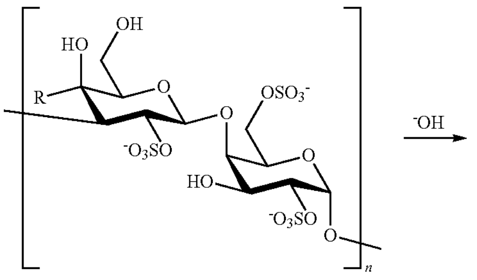

λ-carrageenan

-continued

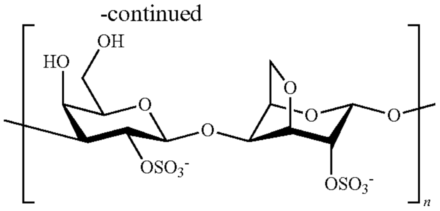

θ-carrageenan where values of n provide weight average molecular weights between about 100 kdaltons to about 5,000 kdaltons. In embodiments, n provides weight average molecular weights between about 300 kdaltons to about 2,000 kdaltons. In embodiments, n provides weight average molecular weights between about 400 kdaltons to about 1,000 kdaltons.

In embodiments, the polysaccharide-based gellant system may comprise a chitosan. Chitosan is a readily available material derived from the shell material of shrimp and other crustaceans. Chitosan has a structure of formula (X):

(X)

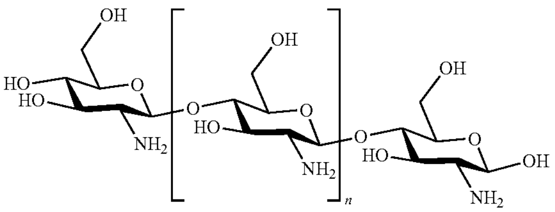

where values of n provide weight average molecular weights between about 10 kdaltons to about 4,000 kdaltons. In embodiments, n provides weight average molecular weights between about 50 kdaltons to about 2,000 kdaltons. In embodiments, n provides weight average molecular weights between about 100 kdaltons to about 800 kdaltons.

In embodiments, chitosan is co-crosslinked with alginate.

In embodiments, the polysaccharide-based gellant system may comprise a scleroglucan. Scleroglucans have a general structure as shown in formula (XI):

(XI)

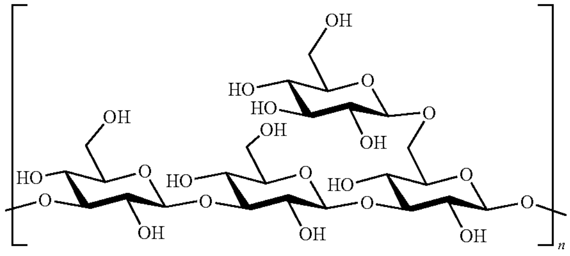

where values of n provide weight average molecular weights in a range from about 0.5 megadaltons to about 4 megadaltons. In embodiments, n provides weight average molecular weights from about 1 megadaltons to about 3 megadaltons. In embodiments, n provides weight average molecular weights of about 2 megadaltons.

In embodimens, scleroglucans form gels in the presence of sodium tetraborate (borax). In embodiments, hydrogels are formed form partially oxidized scleroglucans, In embodiments, the gel character is tuned by the degree of oxidation.

In embodiments, the polysaccharide-based gellant system may include a diutan gum. Diutan is a complex polysaccharide structures with a backbone made up of d-glucose, d-glucuronic acid, d-glucose, and l-rhamnose, and a side chain of two l-rhamnose residues. In embodiments, diutans have a weight average molecular weight from about 1 megadaltons to about 10 megadaltons. In embodiments, diutans have a weight average molecular weight of about 5 megadaltons. In embodiments, diutans are a gel modifier. In embodiments, diutans are used with other polysaccharides that are amenable to calcium ion crosslinking.

In embodiments, the polysaccharide-based gellant system may include a pectin. Pectins are polysaccharides rich in galacturonic acid and are found commonly in fruits. In nature, the galacturonic acids may be present with a variable degree of methylation (methyl ester). In embodiments, the pectin is a so called "low methoxy" pectin, i.e., a low degree of methyl ester, called LM-pectin. LM-pectin readily forms a gel system in the presence of calcium ion as a crosslinker.

In embodiments, the primary polysaccharide of a gellant system may be present in an amount from about 1 to about 50% w/w of the gel composition. In embodiments, the primary polysaccharide may be present at about 1% w/w of the gel composition, or about 2%, or about 3%, or about 5%, or about 10%, or about 15%, or about 20%, or about 25%, or about 30%, or about 35%, or about 40%, or about 45%, or about 50% w/w, including any value in between and fractions thereof. In embodiments, the primary polysaccharide of a gellant system may be present in an amount from about 1% w/w/ to 10% w/w of the gel composition, or about 10% w/w to about 20% w/w of the gel composition, or about 20% w/w to about 30% w/w of the gel composition, or 30% w/w to about 40% of the gel composition, or about 40% w/w to about 50% w/w of the gel composition, including any sub-range in between and fractions thereof.

In embodiments, the gellant systems comprise a gel modifier. In some such embodiments, the gel modifier comprises a crosslinker. Polyhydric systems (containing many hydroxyl groups) such as polysaccharides are frequently susceptible to crosslinking in the presence of metal ions. In some such embodiments, the crosslinker may comprise a divalent or trivalent metal cation. Among divalent metal cations, the crosslinker may comprise any of the alkaline earth metals. Exemplary crosslinkers may comprise a borate, a titanate, calcium ion, aluminum ion, copper ion, zinc ion, zirconium ion, magnesium ion, barium ion, strontium ion, oxides of any of the foregoing metals and combinations thereof.

Other crosslinkers or viscosity managing gel modifiers in polysaccharide-based gellant systems include surfactants. When present, the surfactant may include one or more of an anionic surfactants, a cationic surfactant, a zwitterionic and/or non-ionic surfactant, and combinations thereof. In embodiments, the polysaccharide-based gellant includes an anionic surfactant. In embodiments, the polysaccharide-based gellant includes a cationic surfactant. In embodiments, the polysaccharide-based gellant includes zwitterionic surfactant. In embodiments, the polysaccharide-based gellant includes non-ionic surfactant.

In embodiments, anionic surfactants which may be utilized include sulfates and/or sulfonates. In embodiments, the anionic surfactant is sodium dodecylsulfate (SDS). In embodiments, the anionic surfactant is sodium dodecylbenzene sulfonate. In embodiments, the anionic surfactant is sodium dodecylnaphthalene sulfate. In embodiments, the anionic surfactant is dialkyl benzenealkyl sulfates and/or sulfonates. In embodiments, the anionic surfactant is an acid. In embodiments, the acid is abitic acid (Aldrich). In embodiments, the acid is NEOGEN® (Daiichi Kogyo Seiyaku). In embodiments, the anionic surfactant is DOWFAX™ 2A1, an alkyldiphenyloxide disulfonate (The Dow Chemical Company). In embodiments, the anionic surfactant is TAYCA POWDER BN2060 from (Tayca Corporation), which are branched sodium dodecylbenzene sulfonates.

In embodiments, the cationic surfactant is alkylbenzyl dimethyl ammonium chloride. In embodiments, the cationic surfactant is dialkyl benzenealkyl ammonium chloride. In embodiments, the cationic surfactant is lauryl trimethyl ammonium chloride. In embodiments, the cationic surfactant is alkylbenzyl methyl ammonium chloride. In embodiments, the cationic surfactant is alkyl benzyl dimethyl ammonium bromide. In embodiments, the cationic surfactant is benzalkonium chloride. In embodiments, the cationic surfactant is cetyl pyridinium bromide. In embodiments, the cationic surfactant is a $C_{12}$, $C_{15}$, and/or $C_{17}$ trimethyl ammonium bromide. In embodiments, the cationic surfactant is a halide salt of quaternized polyoxyethylalkylamines. In embodiments, the cationic surfactant is dodecylbenzyl triethyl ammonium chloride. In embodiments, the cationic surfactant is MIRAPOL™. In embodiments, the cationic surfactant is ALKAQUAT™ (Alkaril Chemical Company). In embodiments, the cationic surfactant is SANIZOL™ (benzalkonium chloride, Kao Chemicals).

In embodiments, the zwitterionic surfactant is a betaine.

In embodiments, the non-ionic surfactants is polyacrylic acid. In embodiments, the non-ionic surfactants is methalose. In embodiments, the non-ionic surfactants is methyl cellulose. In embodiments, the non-ionic surfactants is ethyl cellulose. In embodiments, the non-ionic surfactants is propyl cellulose. In embodiments, the non-ionic surfactants is hydroxy ethyl cellulose. In embodiments, the non-ionic surfactants is carboxy methyl cellulose. In embodiments, the non-ionic surfactants is polyoxyethylene cetyl ether. In embodiments, the non-ionic surfactants is polyoxyethylene lauryl ether. In embodiments, the non-ionic surfactants is polyoxyethylene octyl ether. In embodiments, the non-ionic surfactants is polyoxyethylene octylphenyl ether. In embodiments, the non-ionic surfactants is polyoxyethylene oleyl ether. In embodiments, the non-ionic surfactants is polyoxyethylene sorbitan monolaurate. In embodiments, the non-ionic surfactants is polyoxyethylene stearyl ether. In embodiments, the non-ionic surfactants is polyoxyethylene nonylphenyl ether. In embodiments, the non-ionic surfactants is dialkylphenoxy poly(ethyleneoxy) ethanol. Note, that among these non-ionic surfactants that act as gel modifiers include examples of functionalized celluloses. Their use as a gel modifier for their surfactant character would be in conjunction with a primary polysaccharide for the purpose of forming the gellant systems disclosed herein.

In embodiments, the gel modifier includes a water-soluble polymer. In embodiments, the water-soluble polymer displays surfactant character. In embodiments, the water-soluble polymer is selected from a poly ether, a polyvinylpyrrolidone, a polyvinyl alcohol, a polyacrylic acid, a polyacrylamide, a polyoxazoline, a polyphosphate, and an albumin. Exemplary water-soluble polymers include polyethylene glycols (PEGs), poloxamers such as PLURONIC™ F-127 (BASF), and water-soluble polysaccharides or their derivatives in classes such as xanthan gums, pectins, chitosans, dextrans, carrageenans, guar gums, and the like. In embodiments, the gel modifier is a polyether. In embodiments, the gel modifier is a polyvinylpyrrolidone. In embodiments, the gel modifier is a polyvinyl alcohol. In embodiments, the gel modifier is a polyacrylic acid. In embodiments, the gel modifier is a polyacrylamide. In embodiments, the gel modifier is a polyoxazoline. In embodiments, the gel modifier is a polyphosphate. In embodiments, the gel modifier is an albumin. In embodiments, the water-soluble polymer is a polyethylene glycol (PEG). In embodiments, the water-soluble polymer is a polaxamer. In embodiments, the poloxamer is PLURONIC™ F-127 (BASF). In embodiments, the water-soluble polymer is a polysaccharide. In embodiments, the water-soluble polymer is a xanthan gum. In embodiments, the water-soluble polymer is a pectin. In embodiments, the water-soluble polymer is a chitosan. In embodiments, the water-soluble polymer is a dextran. In embodiments, the water-soluble polymer is a carrageenan. In embodiments, the water-soluble polymer is a guar gum.

In embodiments, the water-soluble polymer is present in an amount from about 1 to about 50% w/w of the gel composition. In embodiments, the water-soluble polymer may be present at about 1% w/w of the gel composition, or about 2%, or about 3%, or about 5%, or about 10%, or about 15%, or about 20%, or about 25%, or about 30%, or about 35%, or about 40%, or about 45%, or about 50% w/w, including any value in between and fractions thereof. In embodiments, the water-soluble polymer of a gellant system may be present in an amount from about 1% w/w/ to 10% w/w of the gel composition, or about 10% w/w to about 20% w/w of the gel composition, or about 20% w/w to about 30% w/w of the gel composition, or 30% w/w to about 40% of the gel composition, or about 40% w/w to about 50% w/w of the gel composition, including any sub-range in between and fractions thereof.

In embodiments, nicotine or salt thereof may be present in a non-zero amount up to about 50% w/w of the gel composition. In embodiments, nicotine or salt thereof may be present in an amount from about 1% w/w to about 5% w/w of the gel composition. In embodiments, nicotine is present from about 0.5% to about 1.5% w/w of the gel composition. Particular concentrations of nicotine can be tuned for delivery of precise amounts of nicotine to a user when the composition is heated in an electronic vapor device. In embodiments, the nicotine or salt thereof may be present at about 1% w/w of the gel composition, or about 2%, or about 3%, or about 5%, or about 10%, or about 15%, or about 20%, or about 25%, or about 30%, or about 35%, or about 40%, or about 45%, or about 50% w/w, including any value in between and fractions thereof. In embodiments, the nicotine or salt thereof may be present in an amount from about 1% w/w/ to 10% w/w of the gel composition, or about 10% w/w to about 20% w/w of the gel composition, or about 20% w/w to about 30% w/w of the gel composition, or 30% w/w to about 40% of the gel composition, or about 40% w/w to about 50% w/w of the gel composition, including any sub-range in between and fractions thereof.

Although the benefits of an aqueous-based polysaccharide system allow for water as the sole carrier for nicotine, nonetheless, compositions disclosed herein may further comprise a humectant. The humectant may serve as a delivery aid for delivering nicotine to a user when the compositions herein are heated. In embodiments, the humectant comprises glycerin. In embodiments, the humectant comprises propylene glycol, vegetable glycerin, triacetin, sorbitol, xylitol, 1,3-propanediol (PDO) or combinations thereof. In embodiments, the propylene glycol, vegetable glycerin, or combinations thereof may comprise less than about 50% w/w of the composition, or may comprise less than 20% w/w of the composition, in other embodiments, or may comprise less than 10% w/w of the composition or may comprise less than 1% w/w of the composition, in further embodiments, or in still further embodiments, the humectant is free of one or more of propylene glycol and vegetable glycerin, though an alternative humectant is present. In embodiments, the humectant may comprise 1,3-propanediol. In embodiments, the humectant may comprise a medium chain triglyceride (MCT) oil. In embodiments, the humectant may comprise PEG 400. In embodiments, the humectant may comprise PEG 4000. In embodiments, the humectant is free of both propylene glycol and vegetable glycerin.

In embodiments, the compositions disclosed herein may include an organic acid. without being bound by theory, the organic acid may service the function of protonating nicotine to deliver nicotine in a salt form, provide organoleptic properties, or both. Organic acids include, without limitation, benzoic acid, pyruvic acid, salicylic acid, levulinic acid, succinic acid, citric acid, malic acid, formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, phenylacetic acid, tartaric acid, lactic acid, malonic acid, fumaric acid, finnaric acid, gluconic acid, saccharic acid, sorbic acid, and malonic acid.

In embodiments, compositions disclosed herein may further comprise a variety of other flavorants (including the aforementioned organic acids). In embodiments, flavorants may include natural extracts, such as menthol, mint, classic Virginia tobacco, cinnamon, clove, ginger, pepper, or other synthetic flavors based on esters and aldehydes. In embodiments, the flavorant may include nicotine salts, such as nicotine acetate, nicotine oxalate, nicotine malate, nicotine isovalerate, nicotine lactate, nicotine citrate, nicotine phenylacetate and nicotine myristate.

As will be apparent to the skilled artisan, gellant systems disclosed herein may take any of numerous forms. In embodiments, the gellant system is provided in the form of macroscopic beads. In some such embodiments, the macroscopic beads may be a shell encapsulating a solution of the nicotine or salt thereof. In other embodiments, the macroscopic beads may be solid or semi-solid, and the nicotine or salt thereof is disposed within the gellant system matrix.

In embodiments, the gellant system may be provided in the form of a film or strip. As such, the film or strip may be placed or formed directly on a heating element of an electronic vapor device. In other embodiments, the gellant system may be provided as a solid mass. In still further embodiments, the gellant system is provided as a plurality of particles of a size in a range from about 1 micron to about 1 mm. In embodiments, the gellant system reversibly forms a fluid liquid on heating and reforms the gellant system on cooling.

In embodiments, there are provided compositions comprising a cellulose matrix, nicotine or a salt thereof, and a water-soluble polymer. The use of cellulose in an aqueous gellant system can be challenging due to it poor water solubility. Therefore, in embodiments, the cellulose matrix may be generated from a cellulose precursor or oligomers with low molecular weight. For example, a solution of cellulose acetate in an organic solvent may provide the precursor to cellulose. Cellulose may later be formed by acetate removal, which may be carried out solvolytically. In embodiments, nicotine may be added to the cellulose acetate solution. Separately, a water-soluble polymer may be added into water. The organic cellulosic solution may then be introduced into the aqueous polymer solution to induce gelation. The organic solvents may be removed by dialyzing or other means, such as evaporation under reduced pressure. The resulting material is a hydrogel of cellulose Accordingly, in embodiments, there are provided compositions made by a process comprising adding nicotine or a salt thereof to a precursor of a cellulose matrix in an organic solvent to form a mixture and adding to the mixture an aqueous solution of a water-soluble polymer. Such a process is exemplified in FIG. 1 which shows the preparation of solution A which comprises a methanol solution of cellulose acetate in the presence of nicotine. In embodiments, nicotine may be disposed in the core of the cellulose matrix, as indicated by the presence of small nicotine particles (gray) inside larger cellulose acetate particles (blue). Separately, a water-soluble polymer is prepared as solution B. In this example, the polymer is PLURONIC™ F-127. Solution A is then added to solution B to form solution C. In embodiments, the particular structure formed here may be an encapsulated cellulose particle with the water-soluble polymer disposed about the outer surface of the cellulose acetate polymer. This structural feature has been supported by preliminary characterization. In embodiments, processes may further comprise removing the organic solvent by dialysis. The exemplary process is shown in FIG. 2. Methanol water mixture that results from solution C is dialyzed against water as the bulk solvent. In embodiments, the dialysis bag may comprise a cellulose membrane with pore size ranging from about 500 Da molecular weight cutoff to about 2,000 Da molecular weight cutoff. Note, the solvents methanol, water, or both may serve to solvolyze the acetate groups on cellulose acetate to liberate the free cellulose structure. Alternatively, the solvent may be removed by evaporation, including evaporation under reduced pressure. As indicated in FIG. 2, nicotine or salt thereof remains disposed within the cellulose matrix, with the water-soluble polymer disposed about the particles of cellulose.

In embodiments, compositions made by the processes employ cellulose precursor which may be cellulose acetate, or any other organic soluble derivative that can be converted to cellulose. Such derivatives include conventional organic synthetic protecting groups for the hydroxyl group that confer solubility to cellulose. See Greene and Wuts, *Protecting Groups in Organic Chemistry,* $2^{nd}$ ed. John Wiley & Sons, NY (1991). In other embodiments, the cellulose precursor may be commercially available derivatives such as ethyl cellulose.

In embodiments, compositions made by the processes described above may employ any number of organic solvents. In embodiments, the organic solvent is selected from the group consisting of methanol, acetone, DMSO and combinations thereof.

Although embodiments described above employ a cellulose matrix (or precursor to generate a cellulose matrix), in other embodiments the cellulose may be a derivative selected from the group consisting of methyl cellulose, ethyl cellulose, ethyl methyl cellulose, hydroxyethyl cellulose, hydroxypropyl cellulose, hydroxyethyl methyl cellulose, hydroxypropyl methyl cellulose, ethyl hydroxyl ethyl cellulose, carboxymethyl cellulose, carboxymethylhydroxyethyl cellulose, cellulose sulfate, and combinations thereof.

In embodiments, composition that employ the product made by the above process may be particulate and have an effective diameter from about 1 micron to about 1 mm. In other embodiments, the particulate may have an effective diameter from about 1 micron to about 10 microns. The size may be controlled by the choice of a particular cellulose source (size, precursor type), solvent, and gel modifier selection.

In one or more of the preceding embodiments, the cellulose based gellant system may employ any water-soluble polymer. In embodiments, the water-soluble polymer is a polyether. In embodiments, the water-soluble polymer is selected from the group consisting of polyethylene glycol (PEG), a block copolymer of PEG and polypropylene glycol (PPG), and combinations thereof. In embodiments, the water-soluble polymer comprises a polyvinylpyrrolidone. The water-soluble polymer may have a number average molecular weight ($M_n$) from about 5,000 daltons to about 30,000 daltons. In other embodiments, the water-soluble polymer has a number average molecular weight (Mn) from about 10,000 daltons to about 20,000 daltons.

In embodiments, a ratio of the cellulose matrix to the water-soluble polymer is in a range from about 10:1 to about 1.5:1, and in embodiments, the ratio is in a range from about 5:1 to about 2:1. The cellulose matrix itself may be used in an amount from about 1 to about 10% w/w of the composition. In embodiments, cellulose may be present at about 1%, or about 2% or about 3%, or about 4%, or about 5%, or about 6%, or about 7%, or about 8%, or about 9%, or about 10% w/w of the composition, including any fractional value thereof.

In embodiments, a concentration of nicotine in the cellulose-based gellant system may be a non-zero amount up to about 50 w/w %. In embodiments, nicotine or salt thereof may be present in an amount from about 1% w/w to about 5% w/w of the gel composition. In embodiments, nicotine is present from about 0.5% to about 1.5% w/w of the gel composition. Particular concentrations of nicotine can be tuned for delivery of precise amounts of nicotine to a user when the composition is heated in an electronic vapor device. In embodiments, the nicotine or salt thereof may be present at about 1% w/w of the gel composition, or about 2%, or about 3%, or about 5%, or about 10%, or about 15%, or about 20%, or about 25%, or about 30%, or about 35%, or about 40%, or about 45%, or about 50% w/w, including any value in between and fractions thereof. In embodiments, the nicotine or salt thereof may be present in an amount from about 1% w/w/ to 10% w/w of the gel composition, or about 10% w/w to about 20% w/w of the gel composition, or about 20% w/w to about 30% w/w of the gel composition, or 30% w/w to about 40% of the gel composition, or about 40% w/w to about 50% w/w of the gel composition, including any sub-range in between and fractions thereof.

Although cellulose provides access to a completely aqueous gellant system for delivering nicotine when the composition is used, the composition may nevertheless further comprise a humectant. In one or more of the preceding embodiments, the humectant comprises propylene glycol, vegetable glycerin, or combinations thereof. In one or more of the preceding embodiments, the propylene glycol, vegetable glycerin, or combinations thereof comprises less than 50% w/w of the composition, or less than 20% w/w of the composition in other embodiments, or less than 10% w/w of the composition, still other embodiments, or less than 1% w/w of the composition, yet other embodiments, or the humectant is free of one or more of propylene glycol and vegetable glycerin in still yet other embodiments. In embodiments, the humectant is free of both propylene glycol and vegetable glycerin, but an alternative humectant is present.

In embodiments, there are provided compositions comprising an alginate, nicotine or salt thereof, and an alginate crosslinker. As described above, alginate may be provided as a salt form prior to crosslinking. In embodiments, the alginate crosslinker comprises a divalent cation. In embodiments, the divalent cation is an alkaline earth metal. In other embodiments, the divalent cation is a transition metal of oxidation state (II), such as zinc or iron. In embodiments the alginate crosslinker comprises calcium ion. In embodiments, the crosslinker comprises chitosan.

In embodiments, an alginate based gellant system may have a concentration of nicotine may be a non-zero amount up to about 50 w/w %. In embodiments, nicotine may have a concentration from about 0.1% w/w % to about 20 w/w %. In embodiments, nicotine or salt thereof may be present in an amount from about 1% w/w to about 5% w/w of the gel composition. In embodiments, nicotine is present from about 0.5% to about 1.5% w/w of the gel composition. Particular concentrations of nicotine can be tuned for delivery of precise amounts of nicotine to a user when the composition is heated in an electronic vapor device. In embodiments, the nicotine or salt thereof may be present at about 1% w/w of the gel composition, or about 2%, or about 3%, or about 5%, or about 10%, or about 15%, or about 20%, or about 25%, or about 30%, or about 35%, or about 40%, or about 45%, or about 50% w/w, including any value in between and fractions thereof. In embodiments, the nicotine or salt thereof may be present in an amount from about 1% w/w/ to 10% w/w of the gel composition, or about 10% w/w to about 20% w/w of the gel composition, or about 20% w/w to about 30% w/w of the gel composition, or 30% w/w to about 40% of the gel composition, or about 40% w/w to about 50% w/w of the gel composition, including any sub-range in between and fractions thereof.

Figure 3:
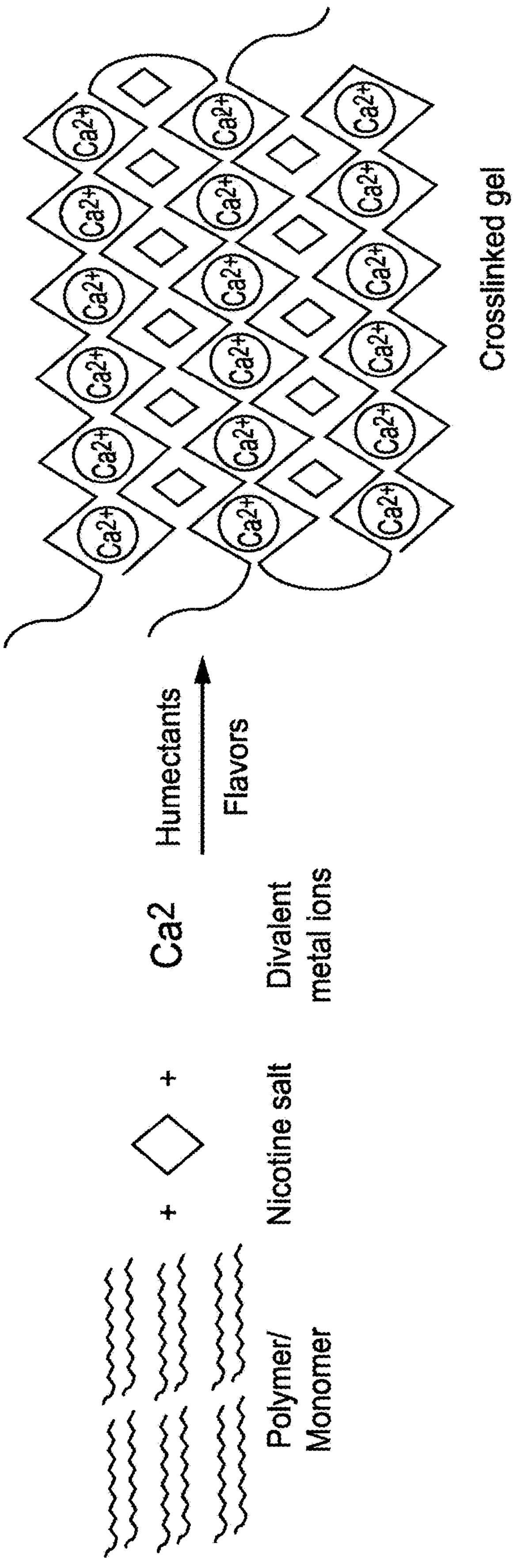
FIG. 3 shows the formation of alginate head in calcium chloride solution and a proposed structure of alginate polymer bound to calcium ion.

In embodiments, the alginate-based composition may take the form of macroscopic beads. In some such embodiments, the macroscopic beads have a diameter from about 100 microns to about 3 mm. The size of the bead may be readily tailored to any desired size according to reaction conditions including, without limitation, concentration of reagents, reaction temperature and mode of reagent mixing. As indicated in FIG. 3, beads may be accessed by adding solutions of sodium alginate (for example) to a solution of crosslinker, such as calcium chloride. FIG. 3 shows a proposed structural organization of the polysaccharide bound to calcium ion. Other divalent metal ions may exhibit similar structural organization.

As with the cellulose based composition, the alginate compositions may also comprise a humectant. In embodiments of the alginate compositions, the humectant comprises propylene glycol, vegetable glycerin, or combinations thereof. In embodiments, the propylene glycol, vegetable glycerin, or combinations thereof comprises less than 50% w/w of the composition, or less than 20% w/w of the composition in embodiments, or less than 10% w/w of the composition in other embodiments, or less than 1% w/w of the composition in still further embodiments. In embodiments, the alginate compositions employ a humectant, but it is free of one or more of propylene glycol or vegetable glycerin. In embodiments, the humectant is free of both propylene glycol and vegetable glycerin.

In embodiments, there are provided compositions made by a process comprising dissolving a crosslinker in water to form a first solution, dissolving an alginate in water to form a second solution, adding a drop of the second solution to the first solution or adding a drop of the second solution to the first solution to form the bead or adding a drop of the first solution to the second solution to form the bead to form the bead, wherein the second solution optionally comprises nicotine or salt thereof.

Figure 4:
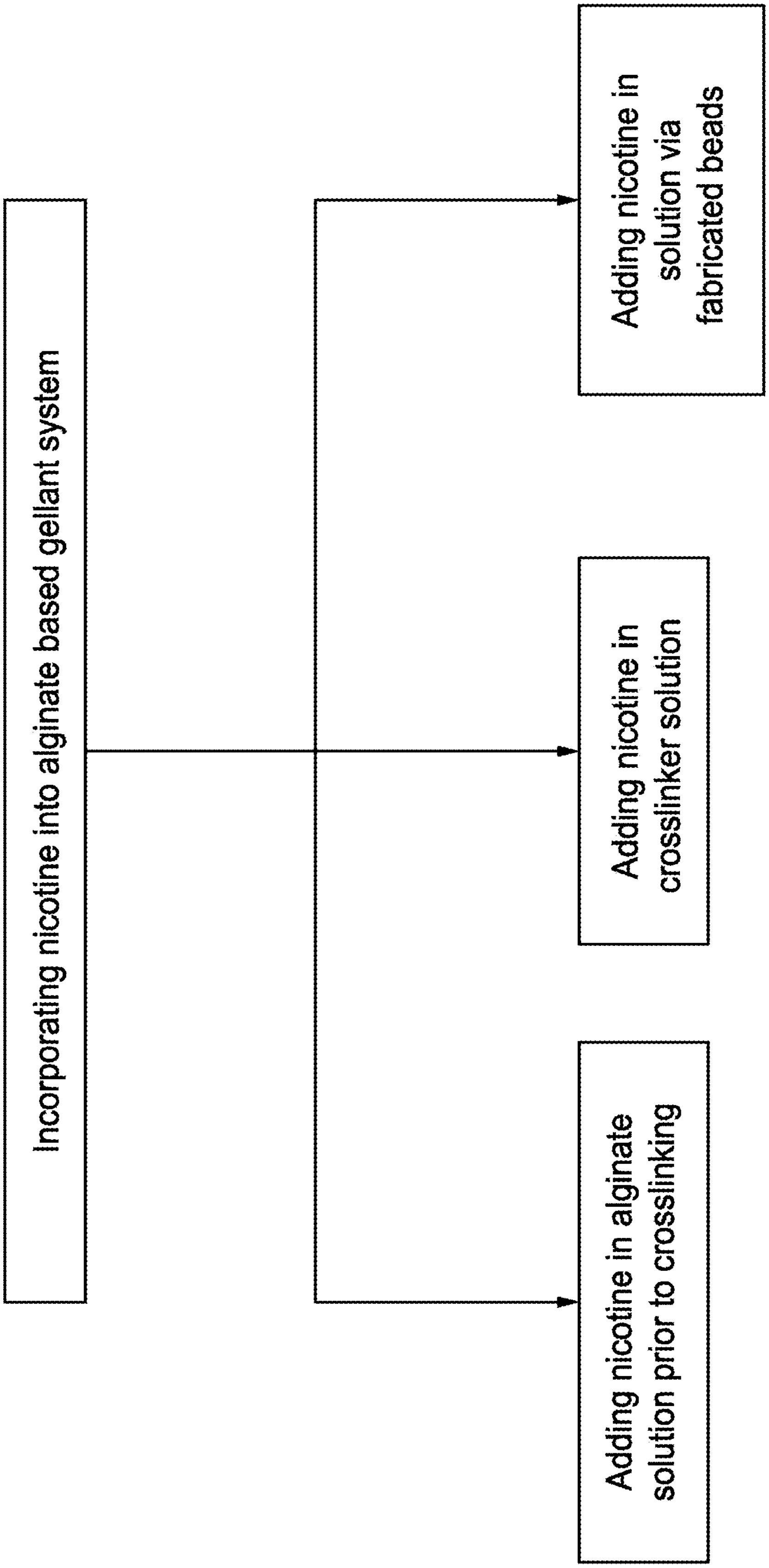
FIG. 4 shows a chart for incorporating nicotine into alginate-based heads.

In embodiments, the first solution comprises nicotine, i.e., nicotine is dissolved along with alginate. In other embodiments, the second solution comprises nicotine, i.e., nicotine is dissolved with the crosslinker. In yet other embodiments, compositions made by the processes herein further comprise loading the bead with nicotine or salt thereof after the formation of the alginate beads. FIG. 4 summarizes these possibilities in chart form.

Figure 5:
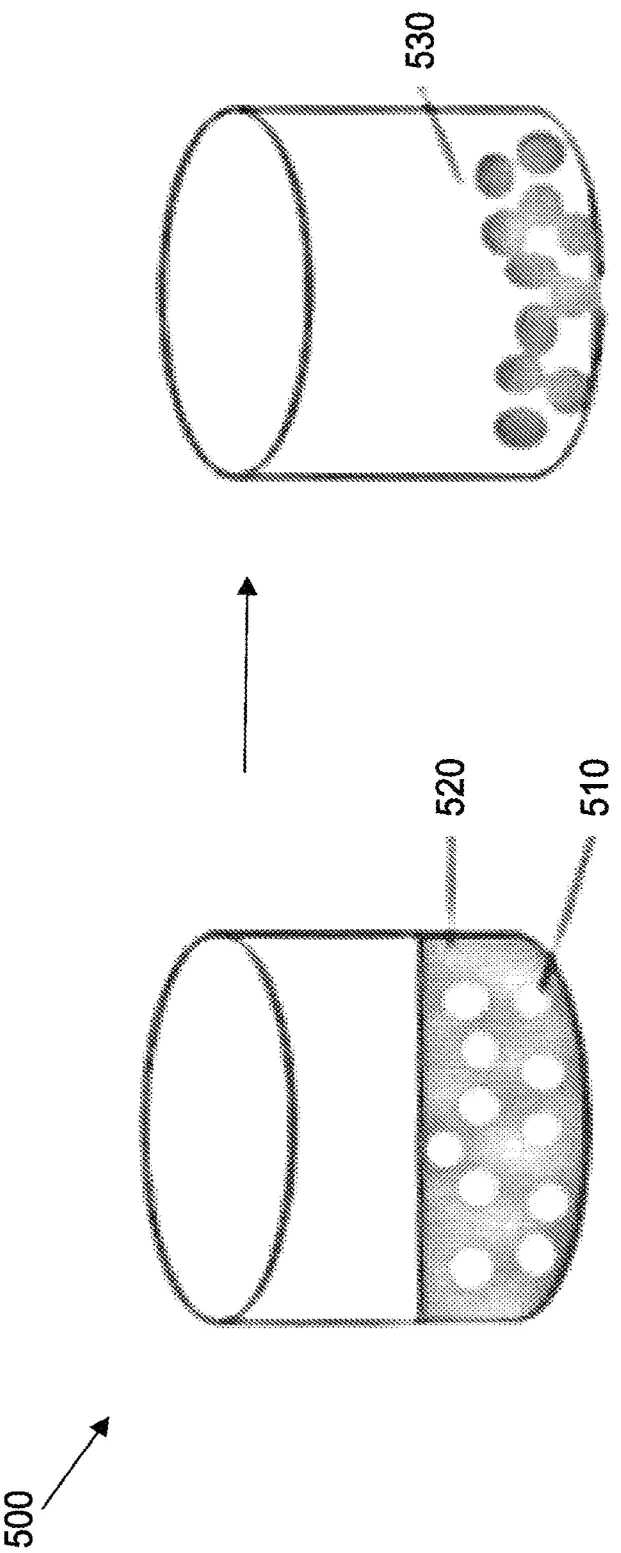
FIG. 5 shows a process by which prefabricated alginate beads are loaded with nicotine.

FIG. 5 shows a process for the incorporation of nicotine into dried prefabricated alginate beads. Beads 510 are suspended in a solution 520 comprising nicotine or salt thereof. The absorbent alginate beads take up solution 520 to provide nicotine loaded beads 530.

Figure 6:
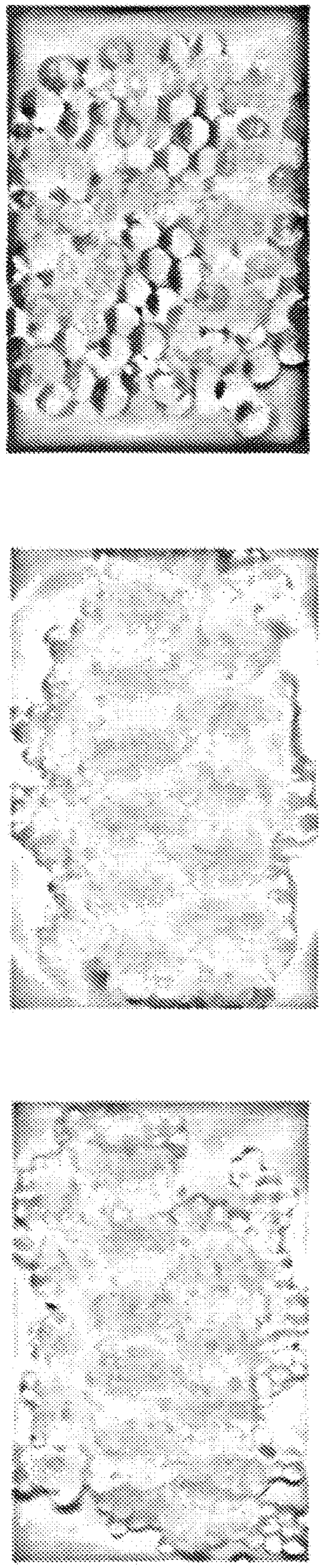
FIG. 6 shows actual alginate gel beads loaded with nicotine.

FIG. 6 shows actual gel alginate beads loaded with nicotine at different concentrations of nicotine in percent weight by weight of the gel bead. The gel viscosity of the prepared beads are shown in centipoise. The process is detailed further below in Example 2.

In embodiments, there are provided compositions comprising a superabsorbent polymer and nicotine or a salt thereof. Superabsorbent polymers provided herein include polymers of acrylic acid and its derivatives as well as polysaccharide-graft co-polymers. The superabsorbent polymer-based compositions may be provided as a hydrogel in embodiments, having water as its principle liquid phase component within the gel network. In embodiments, the superabsorbent polymers may be provided as a hydrogel with an organic liquid phase co-solvent in smaller quantities than water. For example, in embodiments, the hydrogel may comprise smaller amounts of humectant ingredients comprising carriers such as propylene glycol, vegetable glycerin and mixtures thereof. In embodiments, the compositions disclosed herein may be classified as organogels where the predominant liquid phase component of the gel system is an organic liquid. For example, the composition may comprise a majority organic liquid phase with the humectant system of mixtures of propylene glycol and vegetable glycerin, with small amounts of water.

In embodiments, the superabsorbent polymer may be a polymer product prepared from monomers selected from the group consisting of an acrylic acid, a salt of acrylic acid, acrylamide, and/or 2-hydroxyethyl methacrylate (HEMA), including combinations thereof. In embodiments, the superabsorbent polymer is a polymer product prepared from a plurality of different monomers. In embodiments, the superabsorbent polymer is a polymer product prepared from a single species of monomer. In embodiments, the superabsorbent polymer may be polyacrylic acid. In embodiments, the superabsorbent polymer may be a polyacrylic acid salt. In embodiments, the superabsorbent polymer may be polyacrylamide. In embodiments, the superabsorbent polymer is a product prepared from one or more monomers of formula (I):

(I)

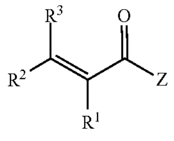

wherein $R^1$, $R^2$, and $R^3$ are independently hydrogen, fluorine or methyl and Z is selected from —OH, —OM, —$NH_2$, —NHMe and —$NMe_2$, wherein M is a metal salt (of the carboxylate group), including, without limitation, sodium or potassium salt.

In embodiments, the superabsorbent polymer is a polymer product prepared from a plurality of different monomers, wherein at least one monomer of the plurality of monomers is a monomer of Formula (I) wherein $R^1$, $R^2$, $R^3$ are each hydrogen and Z is $NH_2$. In embodiments, the superabsorbent polymer is a polymer product prepared from a single species of monomer, wherein ingle species of monomer is a monomer of Formula (I) wherein $R^1$, $R^2$, $R^3$ are each hydrogen and Z is $NH_2$. In embodiments, the superabsorbent polymer is a polymer product prepared from a plurality of different monomers, wherein at least one monomer of the plurality of monomers is a monomer of Formula (I) wherein $R^1$, $R^2$, $R^3$ are each hydrogen and Z is OM, where M is a sodium salt. In embodiments, the superabsorbent polymer is a polymer product prepared from a single species of monomer, wherein the single species of monomer is a monomer of Formula (I) wherein $R^1$, $R^2$, $R^3$ are each hydrogen and Z is OM, where M is a sodium salt. In embodiments, the superabsorbent polymer is a polymer product prepared from a plurality of different monomers, wherein at least one monomer of the plurality of monomers is a monomer of Formula (I) wherein $R^1$, $R^2$, $R^3$ are each hydrogen and Z is OH. In embodiments, the superabsorbent polymer is a polymer product prepared from a single species of monomer, wherein single species of monomer is a monomer of Formula (I) wherein $R^1$, $R^2$, $R^3$ are each hydrogen and Z is OH.

In embodiments, the superabsorbent polymer is a homopolymer of one monomer of the above-mentioned acrylic acid or a derivative of acrylic acid. In embodiments, the homopolymer is polyacrylic acid. In embodiments, the homopolymer is polyacrylamide. In embodiments, the homopolymer is poly(methyl acrylate). In embodiments, the homopolymer is not crosslinked. In embodiments, the homopolymer is crosslinked, as described herein further below.

In embodiments, the superabsorbent polymer may be a random co-polymer of two or more monomers. Exemplary random co-polymers include, acrylic acid-acrylamide co-polymer, acrylic acid-methyl acryrlate co-polymer, acrylic acid-acrylic acid salt-co-polymer, acrylamide-methyl acrylate co-polymer, acrylamide-acrylic acid salt co-polymer, acrylic acid-acrylic acid salt-acrylamide co-polymer, acrylic acid-acrylamide-methyl acrylate co-polymer, acrylamide-methyl acrylate-acrylic acid salt co-polymer, and acrylic acid-acrylamide-methyl acrylate-acrylic acid salt co-polymer. Without being bound by theory, some amounts of acrylic acid or its salt may be beneficial in interacting with (acrylate salt) or forming nicotine salts (acrylic acid).

In embodiments, random co-polymers of two monomers can comprise the monomers in any desired ratio from 1:99 to 99:1 inclusive and any desired subrange of ratios in between, including fractions thereof. Exemplary ratios include, without limitation, 2:1, 1:2, 1:1, 3:1, 1:3, 10:1, and 1:10.

In embodiments, the superabsorbent polymer may be in the form of block co-polymers, including A-B diblock and A-B-C triblock co-polymers. Block co-polymers are characterized by having blocks of repeating identical monomer units, but are co-polymers by virtue of having repeating blocks of a second repeating monomer unit within the polymer framework. For example, di-block co-polymers may comprise blocks of polyacrylic acid in a co-polymer with blocks of polyacrylamide, or blocks of acrylic acid salt in a co-polymer with blocks of polyacrylamide, or blocks of poly(methyl acrylate) in a co-polymer with blocks of polyacrylamide. Likewise, triblock co-polymers may comprise three different monomer blocks. For example, triblock copolymers may comprise polyacrylic acid blocks along with poly(methyl acrylate) blocks and polyacrylamide blocks. Those skilled in the art will recognize that block co-polymers can be designed with varying ordering of blocks, for example, A-B-A-C-A-B-A-C, or A-C-B-A-B-C-A, where each block A, B, and C represent different polymer blocks of a single monomer type, such as A=polyacrylic acid block, B=poly(methyl acrylate) block, and C=polyacrylamide block. Accordingly, the superabsorbent polymers that are block co-polymers can order A, B, and C blocks in any desired order and combination.

In embodiments, acrylate-based superabsorbent polymers described herein may be formed in the presence of a crosslinker. Non-limiting examples of crosslinkers include N,N'-methylene bisacrylamide (MBA), ethyleneglycol dimethacrylate (EGDMA), 1,1,1-trimethylolpropane triacrylate (TMPTA), and tetraallyloxyethane (TAOE). In embodiments, the crosslinker may comprise a compound of formula II:

(II)

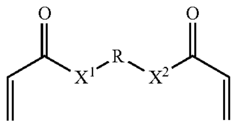

wherein R is $(CH_2)_n$, where n is an integer from 1 to 3, and $X^1$ and $X^2$ are independently O or NH. In embodiments, n is 1. In embodiments, n is 2. In embodiments, n is 3. In embodiments, $X^1$ is O. In embodiments, $X^1$ is NH. In embodiments, $X^2$ is O. In embodiments, $X^2$ is NH. In embodiments, $X^1$ is O and $X^2$ is NH. In embodiments, $X^1$ and $X^2$ are O. In embodiments, $X^1$ and $X^2$ are NH.

In embodiments, n is 1 and each X is O. In embodiments, n is 2 and each X is O. In embodiments, n is 3 and $X^1$ and $X^2$ are O. In embodiments, n is 1 and $X^1$ and $X^2$ are NH. In embodiments, n is 2 and $X^1$ and $X^2$ are NH. In embodiments, n is 3 and $X^1$ and $X^2$ are O. In embodiments, n is 1, $X^1$ is O and $X^2$ is NH. In embodiments, n is 2, $X^1$ is O and $X^2$ is NH. In embodiments, n is 3, $X^1$ is O and $X^2$ is NH.

In embodiments, the crosslinker may be present in and amount from about 1% to about 10% w/w of monomers. In embodiments, the crosslinker may be present in a range from 1 to 5%, or from 1 to 2%. In embodiments, the crosslinker may be present in an amount of about 1%, or 2%, or 3%, or 4%, or 5%, or 6%, or 7%, or 8%, or 9%, or 10%, or any fractional amount between these amounts. Those skilled in the art will recognize that the degree of crosslinking relates to the amount that a given superabsorbent polymer can swell, with higher crosslinking associated with lower swelling capacity. Some crosslinking may be desirable to prevent dissolution of the polymer network. Crosslinking may be particularly important when employing charged monomer units such as acrylate anion.

In embodiments, crosslinking may comprise so called "bulk" or "core" crosslinking in which crosslinking is effected during the polymerization process. In other embodiments, crosslinking may be comprise "surface" crosslinking, which is crosslinking that occurs after the main polymerization process is complete. Accordingly, the crosslinking that occurs in surface crosslinking takes place predominantly at the surface of the polymer. Surface crosslinking is generally performed on dried polymer material with a crosslinking solution. A typical process may employ crosslinking with crosslinkers that have at least two functional groups. For example, glycerine and other polyhydric alcohols may be used to crosslink surface carboxyl groups on a polyacrylate polymer. When employing surface crosslinking as a structural element of the SAP, the initial core/bulk polymerization may be "light," e.g., about 0.005 to about 1.0 mole percent based on moles of monomer employed.

In embodiments, crosslinking may comprise a combination of core/bulk crosslinking and surface crosslinking. For example, light crosslinking may be employed during monomer polymerization, followed by surface crosslinking after the initial polymer is formed. The combined effect of bulk crosslinking and surface crosslinking is a structure that has a lightly crosslinked core and surface have a higher crosslinking density. By employing both crosslinking techniques the superabsorbent polymer can be highly tailored to specific properties, such as maximum volume liquid uptake of the final superabsorbent polymer. This can be useful for highly controlling the amount of a solution (such as a nicotine-containing solution) is absorbed.

In embodiments, the superabsorbent polymer may also comprise graft-copolymers. In embodiments, the superabsorbent polymer may comprise a chemically-crosslinked polysaccharide or a graft polysaccharide-polyacrylonitrile. In embodiments, polysaccharides in crosslinked or graft systems may include, without limitation, cellulose, starch, chitosan, gelatin, xanthan gums, guar gums, alginates, carboxymethylcellulose, and the like. Crosslinkers with polysaccharides may include any difunctional organic molecules that have at least two electrophilic centers. Exemplary crosslinkers include, without limitation, divinyl sulfones, glyoxal, and epichlorohydrin. Other crosslinkers include $POCl_3$, citric acid, glycerol, and the like. Those skilled in the art will appreciate that the selection of a particular linker may be guided by the selection of polysaccharide. For example, the polysaccharide carboxylmethyl cellulose may be crosslinked via its carboxyl functionality through ester formation with a diol containing organic linker, such as glycerol. Other polysaccharides may be O-linked to linking groups through polysaccharide hydroxyl functional groups using electrophilic reagents such as divinyl sulfone.

In embodiments, superabsorbent polymers may comprise chemically modified starch and cellulose and polymers like poly(vinyl alcohol) PVA, poly(ethylene oxide) PEO all of which are hydrophilic and have a high affinity for water. At low crosslinking, such as about 0.05 to about 1%, these polymers may swell in water but may not be water-soluble. Examples of water soluble polysaccharides are starches, water soluble celluloses and polygalactomannans. Suitable starches include, without limitation natural starches, such as sweet potato starch, potato starch, wheat starch, corn starch, rice starch, tapioca starch and the like. Processed or modified starches, such as dialdehyde starch, alkyl-etherified starch, allyl-etherified starch, oxyalkylated starch, aminoethyl-etherified starch, and cyanoethyl-etherified starch are also suitable.

In embodiments, water-soluble celluloses useful in SAP structures are those obtained from such sources as wood, stems, bast, seed fluffs and the like which are then derivatized to form hydroxyalkyl cellulose, carboxymethyl cellulose, methyl cellulose and the like. Suitable polygalactomannans are guar gum and locust bean gums as well as the hydroxyalkyl, carboxyalkyl, and aminoalkyl derivatives.

In embodiments, the superabsorbent polymers disclosed herein may have a number average molecular weight ($M_n$) of at least about 50,000 daltons. In embodiments, the superabsorbent polymers disclosed herein may have a number average molecular weight ($M_n$) in a range from about 50,000 daltons to about 150,000 daltons, or from about 80,000 daltons to about 150,000 daltons in embodiments, or from about 90,000 daltons to about 120,000 daltons in embodiments. The number average molecular weight is the total weight of the sample divided by the number of molecules in the sample.

In embodiments, nicotine or salt thereof is present in an amount from about 1% w/w to about 5% w/w of the gel composition. In embodiments nicotine is present from about 0.5% to about 1.5% w/w of the gel composition. Particular concentrations of nicotine can be tuned for delivery of precise amounts of nicotine to a user when the composition is heated in an electronic vapor device. Nicotine may be incorporated into the superabsorbent polymers either during synthesis of the SAP or with a pre-fabricated SAP material.

Although the benefits of an aqueous-based SAPs allow for water as the sole carrier for nicotine, nonetheless, compositions disclosed herein may further comprise a humectant. The humectant may serve as a delivery aid for delivering nicotine to a user when the compositions herein are heated. In embodiments, the humectant comprises glycerin. In embodiments, the humectant comprises propylene glycol, glycerin, triacetin, sorbitol, xylitol, 1,3-propanediol (PDO) or combinations thereof. In embodiments, the propylene glycol, glycerin, or combinations thereof may comprise less than about 50% w/w of the composition, or may comprise less than 20% w/w of the composition, in other embodiments, or may comprise less than 10% w/w of the composition or may comprise less than 1% w/w of the composition, in further embodiments, or in still further embodiments, the humectant is free of one or more of propylene glycol and glycerin, though an alternative humectant is present. Other humectants that may be employed in the compositions disclosed herein include, without limitation, 1,3-propanediol and MCT oil. In embodiments, the humectant is free of both propylene glycol and glycerin. In one or more of the preceding embodiments, the glycerin may be vegetable glycerin.

In embodiments, the compositions disclosed herein may include an organic acid. In embodiments, the organic acid may serve the function of protonating nicotine to deliver nicotine in a protonated form (i.e., a salt form). Organic acids include, without limitation, benzoic acid, pyruvic acid, salicylic acid, levulinic acid, succinic acid, citric acid, malic acid, formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, phenylacetic acid, tartaric acid, lactic acid, malonic acid, fumaric acid, finnaric acid, gluconic acid, saccharic acid, sorbic acid, ascorbic acid and malonic acid.

Organic acids may be present in the compositions in a range from about 0% by weight to about 25% by weight. In embodiments, the organic acids may be present in a non-zero amount up to about 25% by weight. In embodiments, the organic acids may be present in an amount from 1% by weight to about 25% by weight, or from about 1% by weight to about 10% by weight, or about 10% by weight to about 25% by weight, or about 1% by weight to about 5% by weight, including any sub-range in between and fractions thereof.

In embodiments, compositions disclosed herein may further comprise a flavorant (including the aforementioned organic acids). Flavorants may include nicotine salts, such as nicotine acetate, nicotine oxalate, nicotine malate, nicotine isovalerate, nicotine lactate, nicotine citrate, nicotine phenylacetate and nicotine myristate.

Flavorants may be present in the compositions in a range from about 0% by weight to about 10% by weight. In embodiments, the flavorants may be present in a non-zero amount up to about 10% by weight. In embodiments, the flavorants may be present in an amount from 1% by weight to about 5% by weight, or from about 1% by weight to about 2% by weight, or about 5% by weight to about 10% by weight, or about 1% by weight to about 2% by weight, including any sub-range in between and fractions thereof.

In embodiments, the composition may be provided in the form of a bead, such as macroscopic beads. In embodiments, the macroscopic beads are porous and incorporate nicotine from a solution of the nicotine or salt thereof. In embodiments, the beads range in size from about 100 microns to about 3 mm. In embodiments, the composition can be molded to shapes other than beads. In embodiments, the beads, when dried, range in size from about 100 microns to about 500 microns. In embodiments, the beads, when dried, range in size from 500 microns to 1 mm. In embodiments, the beads, when dried, range in size from 1 mm to 3 mm. In embodiments, the beads, when dried, range in size from 1 mm to 2 mm.

In embodiments, compositions disclosed herein may be characterized by physical properties including, without limitation, swellability, density, porosity and the like. Those skilled in the art will recognize that swellability may be a function of time. In embodiments, swelling may be in a range from about 100 g/g to about 300 g/g. In embodiments, the swell is about 120 minutes. In embodiments the swelling is about 200 g/g. In embodiments the swelling is about 100 g/g. In embodiments the swelling is about 50 g/g. In embodiments the swelling is about 20 g/g. In embodiments the swelling is about 10 g/g. Those skilled in the art will recognize that the lower limit can be much lower than 100 g/g with, such as 50 g/g, or 20 g/g, or 10 g/g. The upper limit of swellability will depend on, inter alia, the degree of crosslinking and the length of time allowed for swelling. Accordingly, in embodiments, the swellability may be more than 300 g/g, such as 350 g/g or 400 g/g, depending on the particular structure of the superabsorbent polymer.

In embodiments, the density of the compositions disclosed herein may be in a range from about 0.5 g/cm$^3$ to about 1.5 g/cm$^3$, or about 0.5 g/cm$^3$ to about 1.3 g/cm$^3$, or about 0.5 g/cm$^3$ to about 1.0 g/cm$^3$. Density, like swellability may depend on, inter alia, the degree of crosslinking and the length of time allowed for swelling.

In embodiments, there are provided compositions made by a process comprising providing a polyacrylamide polymer and adding a solution of nicotine to the polyacrylamide polymer thereby loading the superabsorbent polymer with nicotine. In embodiments, the polyacrylamide polymer may be provided in bead form.

In embodiments, the nicotine solution is aqueous. In embodiments, the nicotine solution comprises a humectant, which may be an organic co-solvent, including propylene glycol, vegetable glycerin or mixtures thereof. In embodiments, the nicotine solution may comprise organic acids and/or flavorants as described above.

In embodiments, a composition may be made by a process in which nicotine is incorporated into the superabsorbent matrix during polymerization of an acrylate-based polymer such as those described hereinabove.

Composition Preparation

In embodiments, a general process for preparing compositions herein comprising aqueous-based gellant systems comprises adding nicotine or a salt thereof to a polysaccharide and adding a gel modifier to form a gellant system. As is evident from the cellulose and alginate examples, the forms of the products may be different and the ordering of reagents may be varied, but the basic principles of the process are shared. Accordingly, in embodiments, the timing of when the nicotine is added may be flexible. It can be added to the polysaccharide, followed by gel formation, or nicotine can be added after or even during the gelation process.

In embodiments, there are provided processes for preparing compositions disclosed herein comprising adding nicotine or a salt thereof to a superabsorbent polymer (SAP).

In embodiments, nicotine is provided neat, i.e., with no solvent. In embodiments, nicotine is provided in an aqueous solution. In some such embodiments, the process may include adjusting the ionic strength of an aqueous solution of nicotine. In embodiments, nicotine is provided in a salt form in an aqueous solution. In embodiments, an organic acid is present in an aqueous nicotine solution. In embodiments an organic acid is present in neat nicotine. In embodiments a flavorant is included in the nicotine solution.

In embodiments, nicotine is provided in a hydrophilic organic solvent. In embodiments, nicotine may be provided as a solution in a mixed organic solvent and water solution. In some such embodiments, the organic solvent is selected to be miscible with water. In embodiments, mixed solvent systems may include an organic acid. In embodiments, mixed solvent systems may include nicotine in salt form.

In embodiments, the process of exposing nicotine or its solutions may be carried out at ambient temperatures, i.e., roughly 25° C.

In embodiments, the superabsorbent polymer may be synthesized in the presence of nicotine or salt thereof in a solution in which polymerization is carried out. In embodiments, the superabsorbent polymer is formed by sedimentation polymerization. In embodiments, the superabsorbent polymer is formed by solution polymerization. In embodiments, the superabsorbent polymer is formed by suspension polymerization. In embodiments, the superabsorbent polymer is formed by emulsion polymerization.

In embodiments, sedimentation polymerization employs non-aqueous oil/paraffin based heating system in which aqueous monomer (such as acrylamide) along with any desired additives (nicotine, initiator, flavorant or combinations thereof but at least the initiator) are added dropwise to the heated oil. For example, the heated oil can be in a columnar arrangement and aqueous drops of the monomer polymerize as they settle in the oil phase. The beads are then simply collected and washed.

In embodiments, solution polymerization generates the superabsorbent polymer in a homogeneous solution. The monomer, such as acrylamide, is dissolved in a desired solvent along with the polymerization initiator and the mixture heated, as necessary to effect the polymerization.

In embodiments, suspension or emulsion polymerizations may be employed, although other additives used for these techniques, such as surfactants can add steps for their removal after polymerization. Nonetheless, such options may be useful to obtain products with different size particles and or configurations. Suspension polymerization may be particularly useful when employing non-water soluble monomer units. Suspension polymerization may provide access to particles that are roughly spherical with effective diameters in a range from about 1 micron to about 1 mm.

In embodiments, initiators of polymerization may be organic initiators, such as peroxides or azo compounds such as azo (bis-isobutyronitirle), AIBN. Other initators include ammonium persulfate, or photoinitiators such as riboflavin or riboflavin-5' phosphate.

In embodiments, polymerization may be carried out in the presence of nicotine, a crosslinker may be present. In emobdiments, the crosslinker is selected from the group consisting of N,N'-methylene bisacrylamide (MBA), ethyleneglycol dimethacrylate (EGDMA), 1,1,1-trimethylolpropane triacrylate (TMPTA), and tetraallyloxyethane (TAOE).

Initiators of polymerization may be present in any amount from about 1% by weight of the monomer to about 10% by weight of the monomer. In embodiments, the initiator is present at about 1% by weight of the monomer, or about 2%, or about 3%, or about 4%, or about 5%, or about 6%, or about 7%, or about 8%, or about 9%, or about 10% by weight of the monomer, including fractional values thereof.

Cartridge

In embodiments, there are provided cartridges for use in a device for releasing nicotine or salt thereof, the cartridge comprising the compositions disclosed herein.

The cartridges may have a variety of configurations depending on the form that the composition. For example, the configurations of the cartridges may vary depending on whether the composition is rendered in the form beads, films, solid gel mass, and the like. In general, the cartridge can comprise a food-safe material. Cartridges can be made from a variety of materials including, but not limited to, metals, rigid plastics, flexible plastics, paper, paperboard, cardboard, and wax paper. Examples of some food-safe materials include aluminum, stainless steel, polyethylene terephthalate (PET), amorphous polyethylene terephthalate (APET), high density polyethylene (HDPE), polyvinyl chloride (PVC), low density polyethylene (LDPE), polypropylene, polystyrene, polycarbonate, and many varieties of paper products. In some cases, especially when the material is paper, the cartridge shell can be lined with a material or a food-safe material to prevent both drying of composition and to protect it from environmental degradation.

In practice, the cartridge is configured to integrate with a device for inhalation of nicotine or nicotine-containing vapor by a subject. In embodiments, the cartridge is formed and shaped for easy insertion into a heating chamber of a device. Moreover, the cartridge is formed and shaped to snugly fit into the cavity of the heating chamber for improved thermal conduction to heat the compositions in the cartridge.

The cartridge can be equipped with a lid, a cover, or a surface seal (e.g., a heat-sealable lidding film) configured to fully enclosed and hermetically seal the cartridge. A sealed cartridge can have the advantage of preserving freshness of the contents and preventing spill of the materials within the cartridge during shipment or handling by the user.

In embodiments, a cartridge can be designed to be disposable and is thus suitable for a single use. In other embodiments, a cartridge can be configured to be reusable such that the same cartridge can be used and/or refilled multiple times. A cartridge can be provided (or sold to an end user) containing a single dose or multiple doses of a composition as disclosed herein. The type of product contained within the cartridge can be stamped or written on the cartridge, or indicated by the color, size, or shape of the cartridge. Alternatively, the cartridge can include circuitry implementing memory (e.g., electrically erasable programmable read-only memory (EEPROM) and/or the like) for storing at least a portion of the information identifying the contents of the cartridge. In embodiments, a cartridge can be filled and/or refilled by an end used with the compositions disclosed herein as well.

Device

The compositions disclosed herein may be used with a device that allows the user to inhale an aerosol, colloquially referred to as "vapor," which can be generated by a heating element that vaporizes some portion of the compositions disclosed herein. The compositions may be provided within a cartridge (e.g., a separable part of the vaporizer device that contains the compositions) that includes an outlet (e.g., a mouthpiece) for inhalation of the aerosol by a user. In other embodiments, the compositions may be provided as part of a heating element in a device that requires no cartridge.

To receive the inhalable aerosol generated by a device, a user may, in certain examples, activate the device by taking a puff, by pressing a button, and/or by some other approach. A puff as used herein can refer to inhalation by the user in a manner that causes a volume of air to be drawn into the device such that the inhalable aerosol is generated by combining the volume of air with a vaporizable portion of the compositions disclosed herein.

In embodiments there are provided devices comprising a heating element configured to heat the compositions herein, to deliver nicotine or salt thereof to a user. In embodiments, the composition is disposed proximate to a heating element, thereby allowing heating of the composition from the inside of the gel material. In embodiments, the compositions disclosed herein may be disposed conformally about any shaped heating element including, without limitation, coils, rods, foils and tapes, porous tapes, porous foils, tapes with printed resistive heating elements, mesh material and the like to allow, in embodiments, the gel to be heated from the inside.

In embodiments, the compositions disclosed herein may be in surface contact with a heating element of a device to deliver nicotine or salt thereof to the user. For example, where the gellant system comprises beads, a device may be configured to deliver/dispense individual beads or a dose of a fixed number of beads to a heating element. Alternatively, the device may be configured to heat individual beads or groups of beads disposed in an array wherein heating is spatially addressable based on the number of uses. In embodiments, the composition may be in any shape, not just bead form. In embodiments, the compositions disclosed herein can be deposited onto a roll or film and heated through conductive, convective, inductive, and radiative heating methods.

EXAMPLES

Example 1

This Example shows the preparation of a nicotine-containing gel in a cellulose-based gellant system, in accordance with some embodiments.

Figure 2:
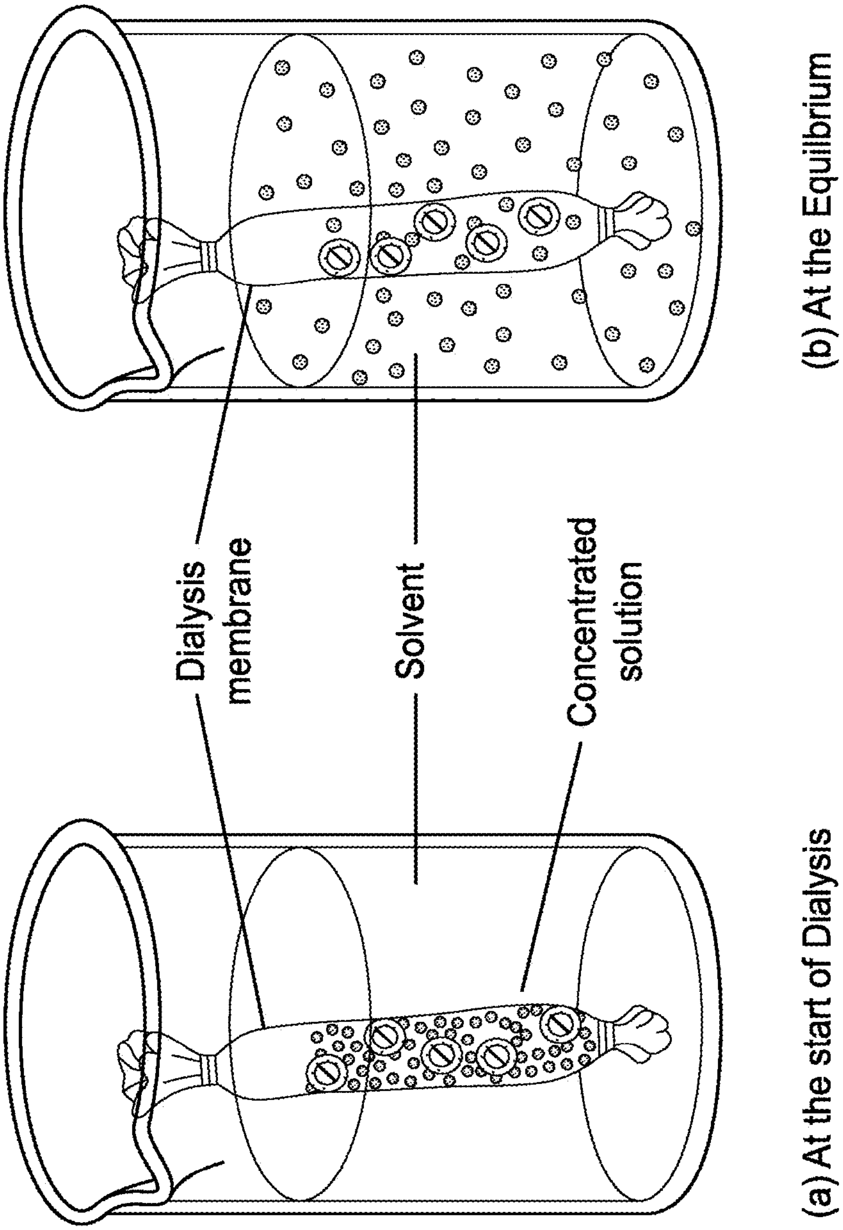
FIG. 2 shows a dialysis process for purifying the gellant system of FIG. 1.

In a representative procedure, a cellulosic substrate, 1 g cellulose acetate, was dissolved in organic solvent, 10 mL methanol (can substitute acetone), and stirred for one hour. 1 mL of nicotine base solution was then added and the mixture allowed to stir for one hour (solution A, see FIG. 1). Next, 0.5 g of water-soluble polymer (PLURONIC® F-127, Sigma) was dissolved in water and stirred for one hour (solution B). Solution B was added to solution A, at room temperature. The mixture was dialyzed (see FIG. 2) for one day to remove the solvents. The final product is a cellulose-immobilized nicotine gel, with nicotine concentrated inside the cellulosic network.

Example 2

This Example shows the preparation of nicotine-containing gel in an alginate bead-based gellant system, in accordance some embodiments.

General procedure: Sodium alginate is dissolved in water with continuous stirring. The concentration of alginate can vary widely, such as from about 1% to about 50%. In embodiments, sodium alginate is used in a range from about 1% by weight to about 2% by weight of the composition. Separately an aqueous solution of calcium chloride or other crosslinker is prepared. The calcium chloride concentration may vary from about 0.5% by weight to about 10% by weight of the composition. The sodium alginate solution is added dropwise into the calcium chloride solution, as shown in FIG. 3. FIG. 3 also indicates the postulated structure of calcium crosslinked alginate. The size of the drops can be modified to control the bead size to any desirable size. The resultant beads are washed with water to remove excess calcium and the beads are dried overnight. Beads can be stored in containers to protect them from moisture.

FIG. 4 shows three exemplary methods to incorporate nicotine into alginate beads. First, nicotine can be added to the alginate solution prior to crosslinking. This has the advantage that nicotine is intimately mixed with the alginate prior to crosslinking and may be readily distributed through the entire bead. Alternatively, nicotine can be incorporated by dissolution in the crosslinker solution. Finally, prefabricated beads after drying can be immersed in a nicotine solution. Such solutions can be completely aqueous based, completely conventional e-liquid based (i.e., PG/VG mixtures), or combinations of the water and conventional humectants.

The last method of absorbing nicotine in a prefabricated bead is shown in FIG. 5. On the left a container holds prefabricated beads which are suspended in a nicotine solution. After time, the beads absorb the solution. The amount absorbed can be controlled as can the concentration of nicotine in the solution.

FIG. 6 shows actual beads that were prepared in accordance with methods disclosed herein. The beads comprise various amounts of nicotine with gel beads of varied viscosity in a propylene glycol/vegetable glycerin system.

Example 3

This Example shows the preparation of a polyacrylamide hydrogel via polymerization of acrylamide monomer in the presence of an organic initiator.

Figure 7:
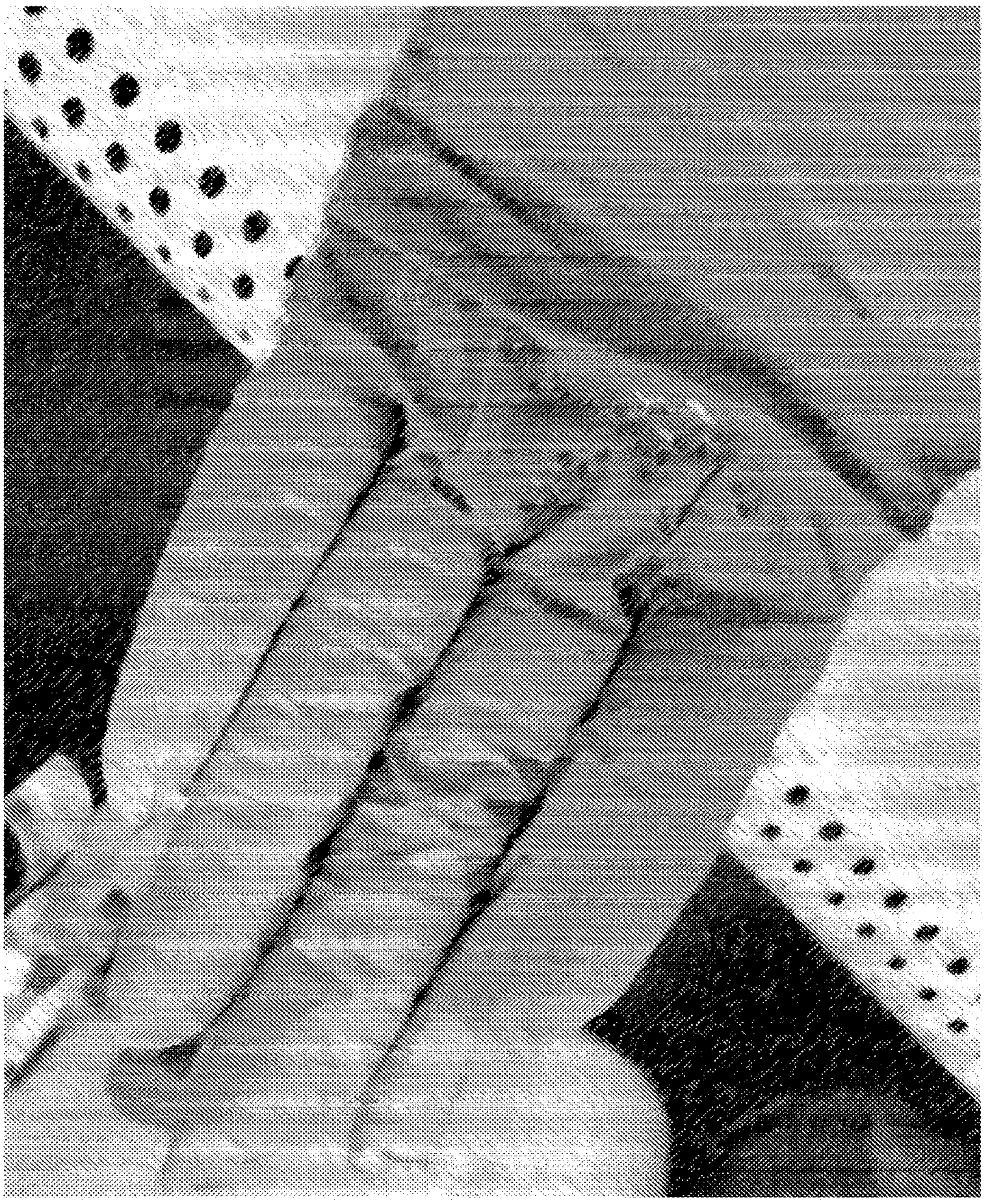
FIG. 7 shows dried polyacrylamide beads prepared in accordance with embodiments disclosed herein.

In a typical process, 2 g of acrylamide (Aldrich Chemical Company) was dissolved in 20 mL of water in 50 ml beaker. 10% (WN) of organic initiator (2,2'-azobis(isobutyronitrile)) was then added to the beaker. The mixture was swirled gently five times by hand to mix all reactants and stored for two hours at room temperature. The synthesized gel was immersed in water for a day, with water changed three times to remove any unreacted monomers and then dried. FIG. 7 shows dried beads prepared in accordance with this procedure. The dried beads were about 1 mm in size and roughly monodisperse.

Figure 8:
FIG. 8 shows a vial of polyacrylamide beads that were placed in neat nicotine demonstrating the absorption of nicotine into the beads, in accordance with embodiments disclosed herein.
Figure 9:
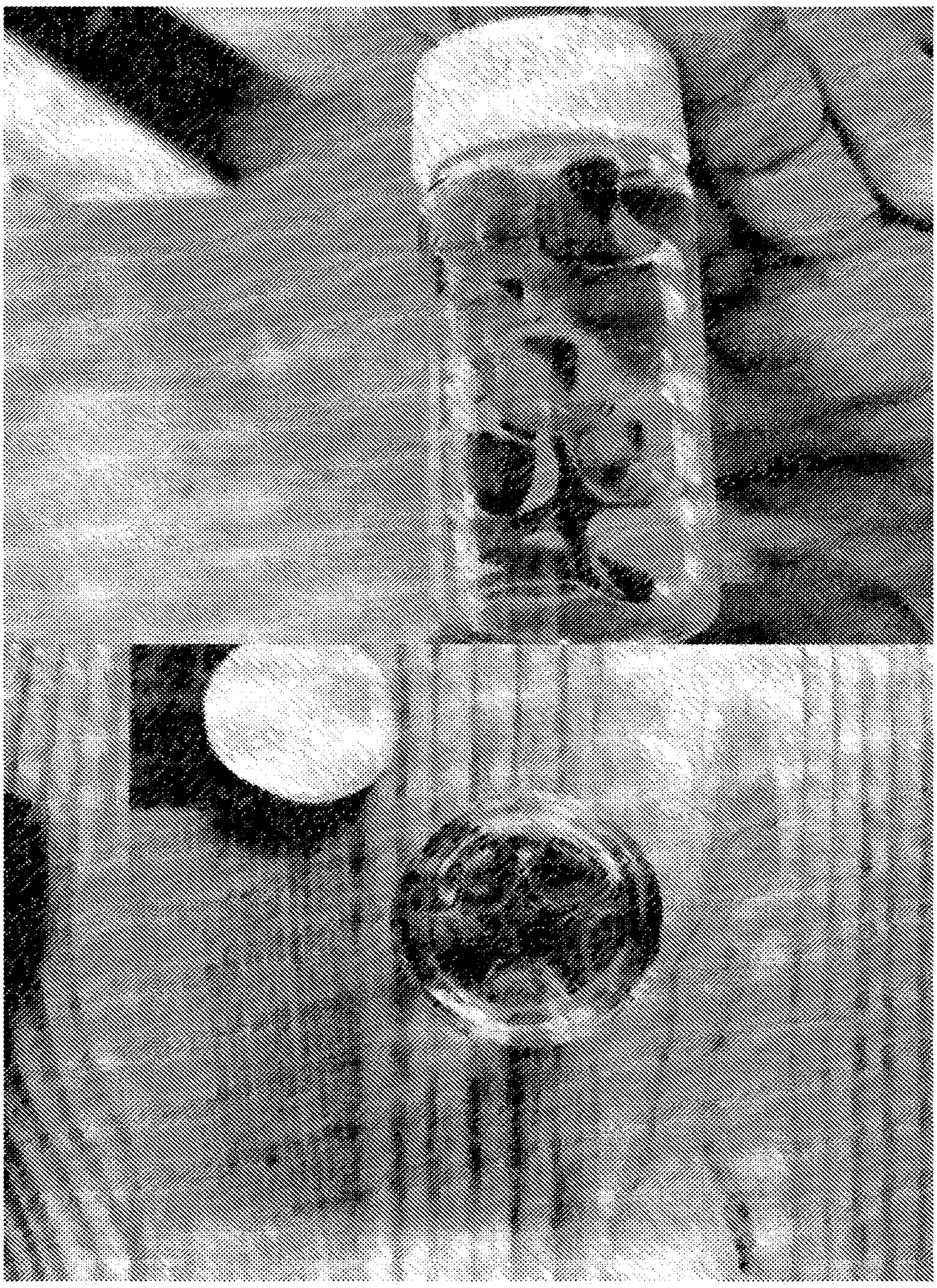
FIG. 9 shows a top and side view of a vial that were placed in a commercial e-liquid nicotine solution demonstrating the absorption of the e-liquid into the beads, in accordance with embodiments disclosed herein.

The dried gel beads were immersed in commercial e-liquids or neat nicotine solution overnight. The next day the gel was swollen from about 1 mm initial size (post drying) to about 10 mm in diameter absorbing nearly all the liquid that was immersed in. FIG. 8 shows the beads that absorbed neat nicotine. FIG. 9 shows a top and side view of beads that were swollen in a commercial e-liquid nicotine solution. It has also been demonstrated that the beads readily absorb aqueous solutions of nicotine and protonated nicotine, as well.

The swollen beads from the nicotine and e-liquid solutions were cut in half and placed on top of a heater. An aerosol was successfully generated at 150° C.

What is claimed is:

1. A composition comprising:

an aqueous polysaccharide-based gellant system comprising:

a polysaccharide gel matrix comprising:

a polysaccharide; and a gel modifier comprising a crosslinker, wherein the crosslinker comprises a borate, a titanate, a calcium ion, an aluminum ion, a copper ion, a zinc ion, a zirconium ion, a magnesium ion, or combinations thereof; and a water-soluble polymer, wherein the water-soluble polymer is selected from the group consisting of a poloxamer, a polyether, a polyvinylpyrrolidone, a polyvinyl alcohol, a polyacrylamide, a polyoxazoline, a polyphosphate, an albumin, and combinations thereof; and nicotine or a salt thereof, wherein the nicotine or salt thereof is disposed within the polysaccharide gel matrix, and wherein the water-soluble polymer encapsulates the polysaccharide gel matrix.

2. The composition of claim 1, wherein the water-soluble polymer has a number average molecular weight (Mn) from about 5,000 daltons to about 30,000 daltons.

3. The composition of claim 1, further comprising a humectant, wherein the humectant comprises propylene glycol, vegetable glycerin, triacetin, sorbitol, xylitol, 1,3-propanediol, or combinations thereof.

4. The composition of claim 3, wherein the propylene glycol, vegetable glycerin, or combinations thereof comprises less than 50% w/w of the composition.

5. The composition of claim 3, wherein the propylene glycol, vegetable glycerin, or combinations thereof comprise less than 20% w/w of the composition.

6. The composition of claim 3, wherein the propylene glycol, vegetable glycerin, or combinations thereof comprise less than 10% w/w of the composition.

7. The composition of claim 3, wherein the propylene glycol, vegetable glycerin, or combinations thereof comprise less than 1% w/w of the composition.

8. The composition of claim 1, wherein the polysaccharide is selected from the group consisting of an alginic acid, a cellulose, a guar (galactomannan), a xanthan gum, an agar, a gellan, an amylose, a welan gum, a rhamsan, a carrageenan, a chitosan, a scleroglucan, a diutan gum, a pectin, a starch, derivatives thereof, and combinations thereof.

9. The composition of claim 8, wherein the cellulose is selected from the group consisting of cellulose, methyl cellulose, ethyl cellulose, ethyl methyl cellulose, hydroxyethyl cellulose, hydroxypropyl cellulose, hydroxyethyl methyl cellulose, hydroxypropyl methyl cellulose, ethyl hydroxyl ethyl cellulose, carboxymethyl cellulose, carboxymethylhydroxyethyl cellulose, cellulose sulfate, cellulose acetate, and combinations thereof.

10. The composition of claim 8, wherein the guar is selected from the group consisting of natural guar, hydroxypropyl guar (HPG), sulfonated guar, sulfonated hydroxypropyl guar, carboxymethyl hydroxypropyl guar (CMHPG), and carboxymethyl guar.

11. The composition of claim 8, wherein the alginic acid is selected from the group consisting of sodium alginate, ammonium alginate, and potassium alginate.

12. The composition of claim 1, wherein the crosslinker further comprises a divalent or trivalent metal cation.

13. The composition of claim 12, wherein crosslinker further comprises an alkaline earth metal.

14. The composition of claim 1, wherein nicotine or salt thereof is present in an amount from about 1% w/w to about 5% w/w.

15. The composition of claim 1, wherein the gellant system is provided in the form of macroscopic beads, a film, a solid mass, or as a plurality of particles.

16. The composition of claim 15, wherein the macroscopic beads have a diameter from about 100 microns to about 3 mm.

17. The composition of claim 1, wherein the gellant system reversibly forms a fluid liquid on heating and reforms the gellant system on cooling.

18. The composition of claim 1, wherein a ratio of the polysaccharide matrix to the water-soluble polymer is about 10:1 to about 1.5:1.

19. The composition of claim 1, wherein a ratio of the polysaccharide matrix to the water-soluble polymer is about in a range of about 5:1 to about 2:1.

20. A process comprising:

adding nicotine or a salt thereof to a polysaccharide;

adding a gel modifier to the polysaccharide, wherein the gel modifier comprises a crosslinker, wherein the crosslinker comprises a borate, a titanate, a calcium ion, an aluminum ion, a copper ion, a zinc ion, a zirconium ion, a magnesium ion, or combinations thereof, thereby forming a polysaccharide gel matrix having disposed therein the nicotine or salt thereof; and adding a water-soluble polymer to the polysaccharide gel matrix, wherein the water-soluble polymer is selected from the group consisting of a poloxamer, a polyether, a polyvinylpyrrolidone, a polyvinyl alcohol, a polyacrylamide, a polyoxazoline, a polyphosphate, an albumin, and combinations thereof, and wherein the water-soluble polymer encapsulates the polysaccharide gel matrix, thereby forming an aqueous polysaccharide-based gellant system.

* * * * *